US007281098B2

(12) United States Patent
Hiraiwa et al.

(10) Patent No.: US 7,281,098 B2
(45) Date of Patent: Oct. 9, 2007

(54) COMPUTER SYSTEM FOR REMOTE COPY

(75) Inventors: Yuri Hiraiwa, Sagamihara (JP);
Nobuhiro Maki, Yokohama (JP);
Kenta Ninose, Yokohama (JP);
Katsuhisa Miyata, Yokohama (JP);
Takashige Iwamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 329 days.

(21) Appl. No.: 11/146,114

(22) Filed: Jun. 7, 2005

(65) Prior Publication Data

US 2006/0224845 A1   Oct. 5, 2006

(30) Foreign Application Priority Data

Mar. 31, 2005   (JP)   ............................. 2005-101346

(51) Int. Cl.
*G06F 12/00* (2006.01)
(52) U.S. Cl. ................... 711/156; 711/159; 711/162
(58) Field of Classification Search ..................... None
See application file for complete search history.

(56) References Cited

U.S. PATENT DOCUMENTS 6,502,205 B1   12/2002   Yani et al.

2003/0051111 A1   3/2003   Nakano et al.
2003/0101318 A1   5/2003   Kaga et al.

FOREIGN PATENT DOCUMENTS

| JP | 2002-215462 | 8/2002 |
| JP | 2003-122509 | 4/2003 |
| JP | 2003-162378 | 6/2003 |

*Primary Examiner*—Reginald Bragdon
*Assistant Examiner*—Ngoc Dinh
(74) *Attorney, Agent, or Firm*—Mattingly, Stanger, Malur & Brundidge, P.C.

(57) ABSTRACT

Provided is a computer system capable of maintaining consistency of data stored in logical volumes. The computer system includes: a storage system including a disk controller which controls data read/write in a disk drive; and a host computer which transmits a request to the storage system, wherein the disk controller has a control unit and a storage unit, the disk drive has logical volumes which are data storing areas, the host computer sends a request directed to the logical volume and attribute information of the logical volume, the control unit wherein: executes the received request; the control unit stores, in the storage unit, the received attribute information in association with the logical volume; and decides to execute a following request which is made by the host computer to the logical volume in a case where the request meets the attribute information corresponding to the logical volume and is stored in the storage unit.

17 Claims, 20 Drawing Sheets

| | | |
|---|---|---|
| 4101 | COMMAND SPECIFICS | "PAIR DELETION" |
| 4102 | P-VOL | DISK CONTROLLER UNIT "A" LOGICAL VOLUME "00" |
| 4103 | S-VOL | DISK CONTROLLER UNIT "B" LOGICAL VOLUME "00" |

COMMAND PARAMETER 410

*FIG.3*

| | |
|---|---|
| 4201 P-VOL DIRECTED INSTRUCTION | EFFECTIVE |
| 4202 READ PROTECT DURING SIMPLEX | OFF |
| 4203 WRITE PROTECT DURING SIMPLEX | ON |
| 4204 NEXT COPY TYPE | ASYNCHRONOUS COPY(S) |
| 4205 NEXT LOGICAL VOLUME TO BE PAIRED WITH | DISK CONTROLLER UNIT "B" LOGICAL VOLUME"00" |
| 4206 S-VOL DIRECTED INSTRUCTION | EFFECTIVE |
| 4207 READ PROTECT DURING SIMPLEX | OFF |
| 4208 WRITE PROTECT DURING SIMPLEX | ON |
| 4209 NEXT COPY TYPE | ASYNCHRONOUS COPY(P) |
| 4210 NEXT LOGICAL VOLUME TO BE PAIRED WITH | DISK CONTROLLER UNIT "A" LOGICAL VOLUME"00" |
| 4211 SETTING EFFECTIVE WHEN | COMMAND IS SUCCESSFUL |

ACL INSTRUCTION PARAMETER 420

FIG.4

| VOLUME "00" ||
|---|---|
| GUARDED OR NOT | GUARDED |
| READ PROTECT DURING SIMPLEX | OFF |
| WRITE PROTECT DURING SIMPLEX | ON |
| NEXT COPY TYPE | ASYNCHRONOUS COPY(S) |
| NEXT LOGICAL VOLUME TO BE PAIRED WITH | DISK CONTROLLER UNIT "B" LOGICAL VOLUME "00" |
| VOLUME "01" ||
| NOT GUARDED | OFF |
| READ PROTECT DURING SIMPLEX | — |
| WRITE PROTECT DURING SIMPLEX | — |
| NEXT COPY TYPE | — |
| NEXT LOGICAL VOLUME TO BE PAIRED WITH | — |

ACL242

FIG.5

COPY GROUP DEFINITION INFORMATION 1221

PAIR INFORMATION 12215

| | | |
|---|---|---|
| 15001 | COMMAND SPECIFICS | "PAIR DELETION" |
| 15002 | P-VOL PARAMETER | WRITE PROTECT ON |
| 15003 | S-VOL PARAMETER | WRITE PROTECT ON |
| 15004 | NEXT COPY INSTRUCTION | S ACCEPTS ASYNCHRONOUS COPY(P) |
| 15005 | NEXT GROUP INFORMATION | COPY GROUP DEFINITION INFORMATION "1" |

INSTRUCTION PARAMETER 150

FIG. 8

COPY GROUP ASSOCIATION DEFINITION INFORMATION 1222

COMPUTER SYSTEM FOR REMOTE COPY

CLAIM OF PRIORITY

The present application claims priority from Japanese application P2005-101346 filed on Mar. 31, 2005, the content of which is hereby incorporated by reference into this application.

BACKGROUND

This invention relates to a computer system having a disk unit and, more specifically, a technique of processing a logical volume copy pair.

The recent rash of natural disasters and terrorist incidents has enhanced the necessity of disaster recovery measures for systems that constitute infrastructures of a society. One of such measures is a data loss prevention method in which a volume from which data is copied (copy source volume) is paired with a volume to which data is copied (copy target volume), and data written in the copy source volume is synchronously or asynchronously copied to the copy target volume so that the copy target volume is put in use in case of a disaster. A variation of this method is also known in which the copy processing is performed among three data centers in order to maintain a configuration recoverable from a disaster that takes down one of the three data centers.

To give an example, two data centers located not far from each other are connected to each other by a copy feature with which data is copied from one to the other by synchronous transfer. One of the two data centers is linked to a third data center, which is on a remote site, by an asynchronous remote copy feature. The third data center holds data received from a host by a storage subsystem of the one of the near site data centers that is connected to the third data center while guaranteeing that the order in which the data is received is kept intact. Another known remote copy control method gives each storage subsystem a feature of tracking the progress of data transfer, reception, and update between storage subsystems set up in two data centers where, in normal operation, data is not transferred, directly (see JP 2003-122509 A).

One way for a computer system that contains a data center holding a huge amount of data to avoid system shutdown due to a failure resulting from a disaster is to have plural data centers and distribute data among the data centers.

In a known example of this disaster recovery measure, a first command to designate a copy source and a copy target designates, as a data copy target of a first logical disk drive, a second logical disk drive, the area of the first logical disk drive is switched with the area of the second logical disk drive, and data in the first logical disk drive is copied to the second logical disk drive based on a second command which instructs to make a copy of data (see JP 2003-162378 A).

One of measures is a data loss prevention method in which a volume from which data is copied (copy source volume) is paired with a volume to which data is copied (copy target volume), and data written in the copy source volume is synchronously or asynchronously copied to the copy target volume so that the copy target volume is put in use in case of a disaster.

JP 2002-215462 A discloses a computer system in which a volume key 571 is assigned to each volume. A volume is written in a secondary disk drive 9 while kept encoded with the volume key 571 that is assigned to this volume. To change the volume key, a secondary storage controller unit 8 receives the current volume key and a new volume key from a primary storage controller unit 5, and the entire record of this volume is decoded with the current volume key and then encoded with the new volume key in a tamper-proof encoding feature 85 while a record to be copied through remote copy is kept sent from the primary storage controller unit 5.

U.S. Pat. No. 6,502,205 discloses a method for preventing content of volume for copy target from making it destroy, designating right or wrong of the access of the volume of copy target beforehand, when the pair relation has interrupted temporarily.

SUMMARY

The prior art described above pays no consideration to risks involved in resetting a copy pair after breaking up a copy pair set across disk drives to make the logical volumes unpaired. For instance, a disturbance to logical volumes which have been a pair and now are broken up (e.g., unscheduled access to these volumes or pairing with other logical volumes than those that have been planned) causes inconsistency between data stored in the logical volumes and, when a new copy pair is made, results in loss of data reliability.

As JP 2003-162378 A and JP 2002-215462 A cited above show, when paired areas of two logical disk drives are unpaired, the areas can be paired with other logical disk drive areas than each other in accordance with a request from a host. When unpaired, the volumes can also accept data write. This could create a situation in which data consistency between the original pair cannot be maintained. The technique of U.S. Pat. No. 6,502,205 A, which is capable of protecting data in a suspended volume pair, is not enough for the running of such a complicated disaster recovery system that stretches across plural data centers since, in this type of system, data in a volume pair has to be protected not only during suspending a pair period but also during an unpaired period after the volume pair is broken up.

It is therefore an object of this invention to provide a computer system capable of avoiding failures as those described above and maintaining consistency between data stored in logical volumes.

According to an embodiment of this invention, there is provided a computer system including: a storage system including a disk controller which controls data read/write in a disk drive; and a host computer which transmits a request to the storage system, wherein the disk controller has a control unit and a storage unit, the disk drive has logical volumes which are data storing areas, the host computer sends a request directed to the logical volume and attribute information of the logical volume, the control unit wherein: executes the received request; the control unit stores, in the storage unit, the received attribute information in association with the logical volume; and decides to execute a following request which is made by the host computer to the logical volume in a case where the request meets the attribute information corresponding to the logical volume and is stored in the storage unit.

According to this invention, other requests than scheduled ones are rejected since attribute information sent from a host computer and stored in a storage unit is consulted to determine whether to execute a following request or not. Unscheduled access to logical volumes is thus prevented, thereby maintaining consistency of data held in the logical volumes and enhancing the usability as a disaster recovery system.

BRIEF DESCRIPTION OF THE DRAWINGS

FIG. 3 is a block diagram of an example of a command parameter.

FIG. 4 is a block diagram of an example of an ACL instruction parameter.

FIG. 5 is a block diagram of an ACL.

FIG. 8 is a block diagram of an instruction parameter.

DETAILED DESCRIPTION OF THE PREFERRED EMBODIMENT

An embodiment of this invention will be described below with reference to the accompanying drawings.

A disk subsystem in this embodiment has copy features as those of JP 2003-122509 A described above. To be specific, when a primary volume (copy source volume) receives a data update instruction from a host computer or others, data is successively copied to a secondary volume (copy target volume) in sync with the update instruction. This is called synchronous remote copy. Another form of remote copy is called asynchronous remote copy, in which data is copied from a primary volume to a secondary volume irregularly irrespective of a data update instruction sent to the primary volume from a host computer or others.

These copy features have, as described in JP 2002-215462 A, a command to manage the state of a pair and to give an instruction on pair operation. This embodiment employs such terms as "simplex" for an unpaired state, "duplex-pending" for a state pending data duplication, "duplex" for a state undergoing data duplication, and "suspended" for a state in which data duplication is halted.

Figure 1:
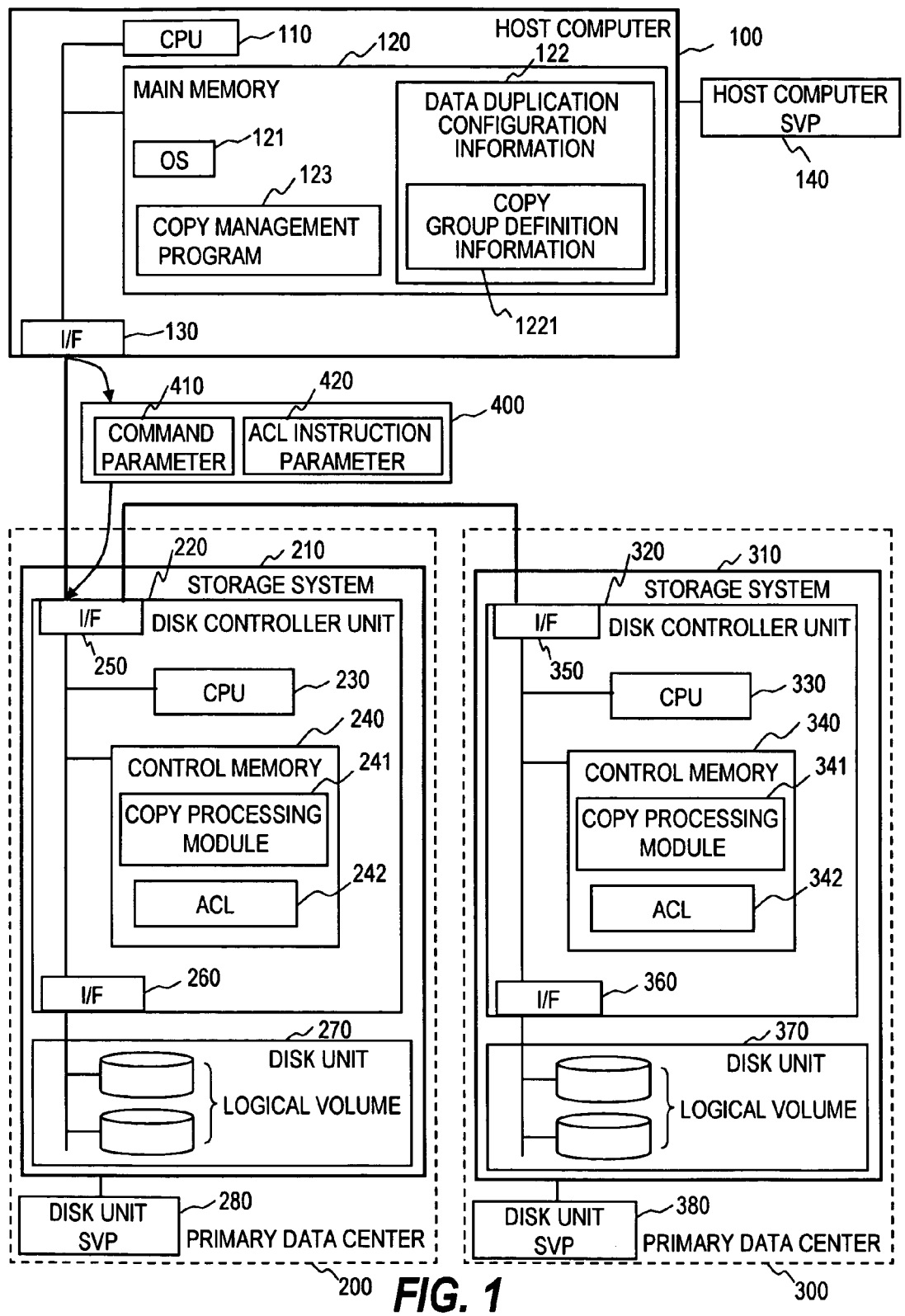
FIG. 1 is a block diagram of a computer system according to an embodiment of this invention.

FIG. 1 is a block diagram of a computer system according to this embodiment.

This computer system comprises one host computer 100 and two data centers (a primary data center 200 and a secondary data center 300).

The host computer 100 is connected to a disk controller unit 220 of the primary data center 200. The disk controller unit 220 of the primary data center 200 is connected to a disk controller unit 320 of the secondary data center 300.

The host computer 100 requests to write or read data in the primary data center 200 and to set the state of a disk unit 270 in the primary data center 200.

The disk controller unit 220 of the primary data center 200 reads or writes data in the disk unit 270 and sets the state of the disk unit 270 in accordance with a request of the host computer 100.

The host computer 100 comprises a CPU 110, a main disk drive 120, and an interface (I/F) 130. A host computer service processor (SVP) 140 is connected to the host computer 100.

The CPU 110 is a processor of the host computer 100. The CPU 110 reads an OS, a program, and the like stored in the main disk drive 120 to execute processing defined by the OS and the program.

The main disk drive 120 is constituted of a memory device such as a DRAM. The main disk drive 120 stores an OS 121, data duplication configuration information 122 and a copy management program 123.

The OS 121 is an operating system of the host computer 100. The CPU 110 executes the OS 121 to make the host computer 100 perform basic operations.

The data duplication configuration information 122 holds information of copy groups set in a storage system to be copied.

A copy group is a group of copy pairs. A copy pair is a structure in which two logical volumes paired with each other store the same data.

For instance, a logical volume in the disk unit 270 of the primary data center 200 and a logical volume in a disk unit 370 of the secondary data center 300 are set as a copy pair. In this case, a data write request issued from the host computer 100 to the logical volume in the disk unit 270 of the primary data center 200 is also processed for the logical volume in the disk unit 370 of the secondary data center 300. As a result, the same data is stored in the primary data center 200 and the secondary data center 300 between which a copy pair is set. The reliability of the system can be enhanced by thus redundantly storing data in physically different data centers.

In general, application programs in a computer system often accesses plural logical volumes from the necessity of handling a data amount that exceeds the data capacity of one volume and for parallel execution of access. Therefore, the plural volumes are processed as one group also when a copy is made with the copy features. Paired volumes are also set or operated as one group. In this embodiment, a group of pairs is called as a "copy group".

The data duplication configuration information 122 contains copy group definition information 1221. The copy group definition information 1221 holds information on which copy pair belongs to which copy group.

The copy management program 123 is a program to manage copy groups set between the primary data center and the secondary data center, and to manage copy operations performed on the copy groups. The copy management program 123 is read and executed by the CPU 120.

The I/F 130 is an interface to exchange data with the disk controller unit 220 of the primary data center 200.

The host computer SVP 140 is an input/output control terminal through which a maintenance instruction and other instructions from an administrator or the like are inputted to the host computer 100.

The primary data center 200 comprises a storage system 210 and a disk unit SVP 280.

The storage system 210 is made up of the disk controller unit 220 and the disk unit 270.

The disk controller unit 220 comprises a CPU 230, a control memory 240, an I/F 250, and an I/F 260. The disk unit 270 is connected to the disk controller unit 220.

The CPU 230 is a processor in the disk controller unit 220.

The control memory 240 is constituted of a memory such as a DRAM. The control memory 240 stores a copy processing module 241 and an access control list (ACL) 242. Also stored in the control memory 240 is information regarding the state of the disk unit 270 (for example, a logical volume state and a copy pair state), which is connected to the disk controller unit 220.

The copy processing module 241 is a program to execute copy processing of the disk unit 270. The copy processing module 241 is read and executed by the CPU 230.

The access control list (ACL) 242 holds settings related to attributes of logical volumes in the disk unit 270.

The disk unit 270 is made up of one or more disk drives. The disk drives constitute a RAID configuration to present one or more logical areas (logical volumes). FIG. 1 shows two logical volumes but more than two logical volumes may be set in the disk unit 270. The disk drive configuration is not limited to a RAID configuration.

In this embodiment, logical volumes are separately set in the disk unit 270 of the primary data center 200 and in the disk unit 370 of the secondary data center 300. Described here is a case of setting a copy pair between a logical volume in the primary data center 200 and a logical volume in the secondary data center 300.

The disk unit SVP 280 is an input/output control terminal through which a maintenance instruction and other instructions from an administrator or the like are inputted to the disk unit 270.

The secondary data center 300 comprises a storage system 310 and a disk unit SVP 380. The storage system 310 and the disk unit SVP 380 are configured in the same way the storage system 210 and the disk unit SVP 280 are configured in the primary data center 200. Specifically, the storage system 310 is made up of the disk controller unit 320 and the disk unit 370, and logical volumes are set in the disk unit 370. The disk controller unit 320 comprises a CPU 330, a control memory 340, an I/F 350 and an I/F 360. The control memory 340 stores a copy processing module 341 and an ACL 342.

Next, copy pair processing will be described.

Copy pair settings are set from the host computer 100 or the disk unit SVP 280. Copy pair processing includes, for example, making copy pair in which a new copy pair is set between logical volumes, deleting copy pair in which a set copy pair is deleted to break up paired logical volumes, suspending copy pair in which set copy processing is halted, and resynchronizing copy pair in which copy processing that has been halted is resumed and resynchronizing the copy pair.

The host computer 100 sends, in order to set copy pair settings, command data 400 to the disk controller unit 220 of the primary data center 200.

The command data 400 contains a command parameter 410 and an ACL instruction parameter 420.

The command parameter 410 holds information to designate specifics of the command, to designate a primary volume and/or a secondary volume, and to designate a copy type (synchronous, asynchronous, or others). The command specifics are to designate making copy pair, deleting copy pair, suspending copy pair, resynchronizing copy pair, or the like described above.

The access control list (ACL) instruction parameter 420 holds information to put write inhibition and/or read inhibition on a logical volume to which it is directed, and to designate the next copy partner, next pair partner and the like of the logical volume.

The disk controller unit 220 analyzes the received command data 400 and sets copy pair settings in accordance with the instructions given by the command data 400.

More specifically, the copy management program 123 of the host computer 100 creates the command data 400. The created command data 400 is sent to the disk controller unit 220 via the I/F 130.

The disk controller unit 220 receives the command data 400 via the I/F 250. The copy processing module 241 analyzes the received command data 400, and executes copy processing in accordance with the result of the analysis.

The copy processing module 241 creates another command data 400, which is to be sent to the disk controller unit 320 of the secondary data center 300 where the copy pair partner designated by the command data 400 is located. The created command data 400 is sent to the disk controller unit 320 via the I/F 250.

The disk controller unit 320 of the secondary data center 300 receives the command data 400 via the I/F 350. The copy processing module 341 analyzes the received command data 400. Pair settings according to the result of the analysis are set via the I/F 360 to the disk unit 370, which is connected to the disk controller unit 320.

An ACL checking/setting module 3412 sets the ACL 342 based on the ACL instruction parameter 420.

Through this processing, copy pair settings are set to logical volumes of the primary data center and the secondary data center.

Figure 2:
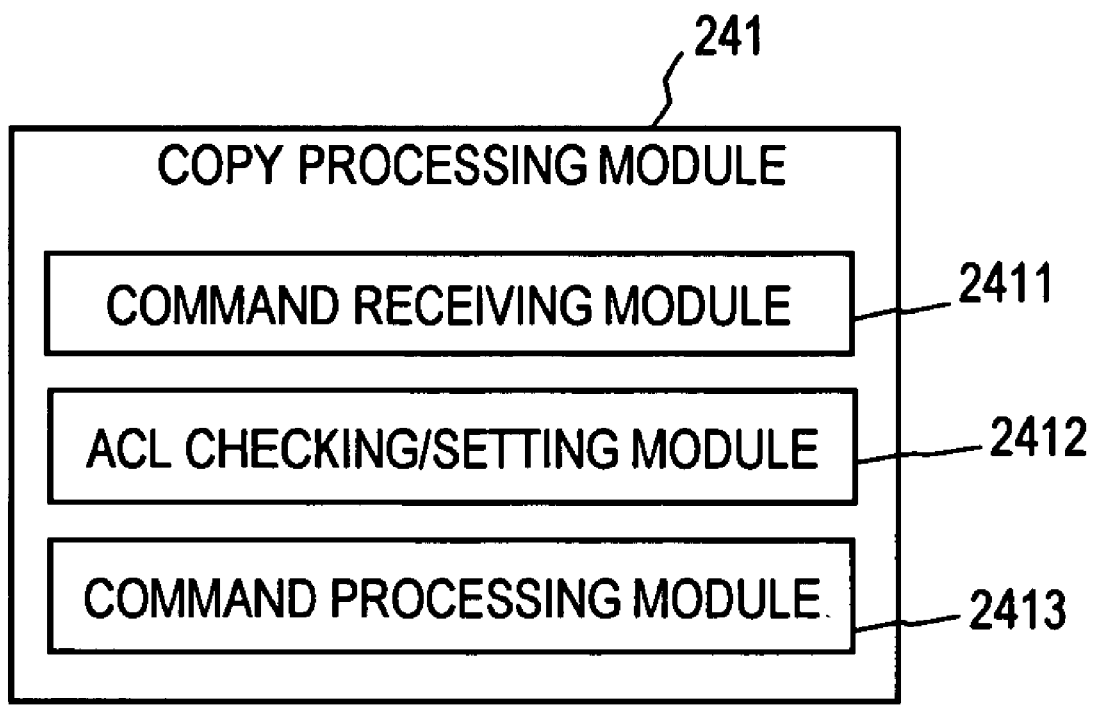
FIG. 2 is a block diagram of a copy processing module stored in a control memory.

FIG. 2 is a block diagram of the copy processing module 241 stored in the control memory 240.

The copy processing module 241 contains a command receiving module 2411, the ACL checking/setting module 2412, and a command processing module 2413.

The command receiving module 2411 analyzes command data received by the disk controller unit 220. When it is proved necessary as a result of the analysis, the command parameter 410 and the ACL instruction parameter are sent to the ACL checking/setting module 2412 and the command processing module 2413.

The ACL checking/setting module 2412 sets the ACL 242 to a logical volume of the disk unit 270 in accordance with the ACL instruction parameter 420. The ACL checking/setting module 2412 also performs processing of rejecting a command that is not consistent with what is set in the ACL 242.

The command processing module 2413 executes copy processing in accordance with the command parameter 410.

The copy processing module 341 of the disk controller unit 320 in the secondary data center 300 has the same configuration.

FIG. 3 is a block diagram of an example of the command parameter 410 contained in the command data 400.

The command parameter 410 contains command specifics 4101, a P-VOL 4102, and an S-VOL 4103.

The command specifics 4101 indicate what command is designated by the command data 400. Stored as the P-VOL 4102 is the identifier of the primary logical volume of a copy pair. Stored as the S-VOL 4103 is the identifier of the secondary logical volume of the copy pair.

In the example of FIG. 3, a "delete pair" command is designated. The designated target of this deleting copy pair command is a copy pair that has a volume "00" of the disk controller unit 220 "A" as the primary logical volume and a volume "00" of the disk controller unit 320 "B" as the secondary logical volume.

Receiving this command data 400, the disk controller unit 220 "A" deletes the copy pair consisting of the primary logical volume "00" and the secondary logical volume "00" of the disk controller unit 320 "B" in accordance with the instructions of the command parameter 410 of the command data 400.

FIG. 4 is a block diagram of an example of the ACL instruction parameter 420 contained in the command data 400.

The ACL instruction parameter 420 is information to designate what ACL is to be set to logical volumes corresponding to a pair, and is added to the command data 400 when necessary.

The ACL instruction parameter 420 contains instructions directed to the primary logical volume of the pair (a P-VOL directed instruction 4201, read protect during simplex 4202, write protect during simplex 4203, a next copy type 4204, and a next pair partner 4205) and instructions directed to the secondary logical volume of the pair (an S-VOL directed instruction 4206, read protect during simplex 4207, write protect during simplex 4208, a next copy type 4209, and a next pair partner 4210). If necessary, the ACL instruction parameter 420 contains a setting-effective-when condition 4211 which has to be met to make the settings effective for the primary or secondary logical volume.

The field of the P-VOL directed instruction 4201 holds information about whether to apply this ACL instruction parameter to the primary logical volume or not.

The field of the read protect during simplex 4202 holds information about whether or not to set read protect, namely, read inhibition, to the logical volume that is put into a simplex state by execution of the command.

A simplex state refers to a state in which a logical volume is unpaired and not set a copy pair.

The field of the write protect during simplex 4203 holds information about whether or not to set write protect, namely, write inhibition, to the logical volume that is put into a simplex state by execution of the command.

The field of the next copy type 4204 holds information on the type of new copy processing when a copy pair is to be newly created from the simplex state.

The field of the next pair partner 4205 holds the identifier of the logical volume with which, when a copy pair is to be created from the simplex state, the simplex logical volume form the new copy pair.

The settings-effective-when condition 4211 instructs to turn settings of the ACL 242 effective only when instructions given to the disk controller unit 220 by the command data 400 are successful.

The ACL instruction parameter 420 is attached to the command data 400 when the host computer 100 sends an instruction to delete a logical volume copy pair.

When a logical volume is in a simplex state, there is a possibility that a request to access this logical volume is granted. Accordingly, logical volumes that have formed a copy pair and stored the same data but now are in a simplex state due to delete a pair or the like may be subjected to a disturbance (unscheduled data write or pairing with other logical volumes than those that have been planned).

In order to avoid a disturbance, the host computer 100 sends the command parameter 410 that instructs to delete a copy pair and the ACL instruction parameter 420 by way of the command data 400. With the ACL instruction parameter 420, limitations are put on requests concerning logical volumes in a simplex state.

The disk controller unit 220 deletes a copy pair in accordance with the command parameter 410 contained in the received command data 400.

At this point, the disk controller unit 220 sets, in accordance with the ACL instruction parameter 420, the ACL 242, which specifies what limitations are put regarding logical volumes that are brought into a simplex state by the deleting pair.

The ACL checking/setting module 2412 consults the ACL 242 to determine whether or not to execute other commands (data read/write in the logical volume, paring, and the like) received via the I/F 250. When limitations are set in the ACL 242, for example, when write inhibition is set in the ACL 242, the ACL checking/setting module 2412 decides not to execute data write in this logical volume.

The ACL checking/setting module 2412 setting limitations about logical volumes will hereinafter be referred to as "guarding".

FIG. 5 is a block diagram of the ACL 242.

The ACL 242 is set for each logical volume set up in the disk unit 270 and is stored in the control memory 240.

The ACL 242 sets attributes of each logical volume set up in the disk unit 270 by the disk controller unit 220.

In the example of FIG. 5, a guarded or not 2422 is set to "guarded" for a logical volume "00". This means that a guard is set to the logical volume "00". How this logical volume is guarded can be known from read protect during simplex 2423, which, in this example, is set to "off", and from write protect during simplex 2424, which is set to "on" in this example. A next copy type 2425 is set to "asynchronous copy (S)", and a next pair partner 2426 is set to the logical volume "00" of the disk controller unit "B".

For a logical volume "01", a guarded or not 2428 is set to "not guarded". This means that no guard is set to this logical volume "01".

Figure 6:
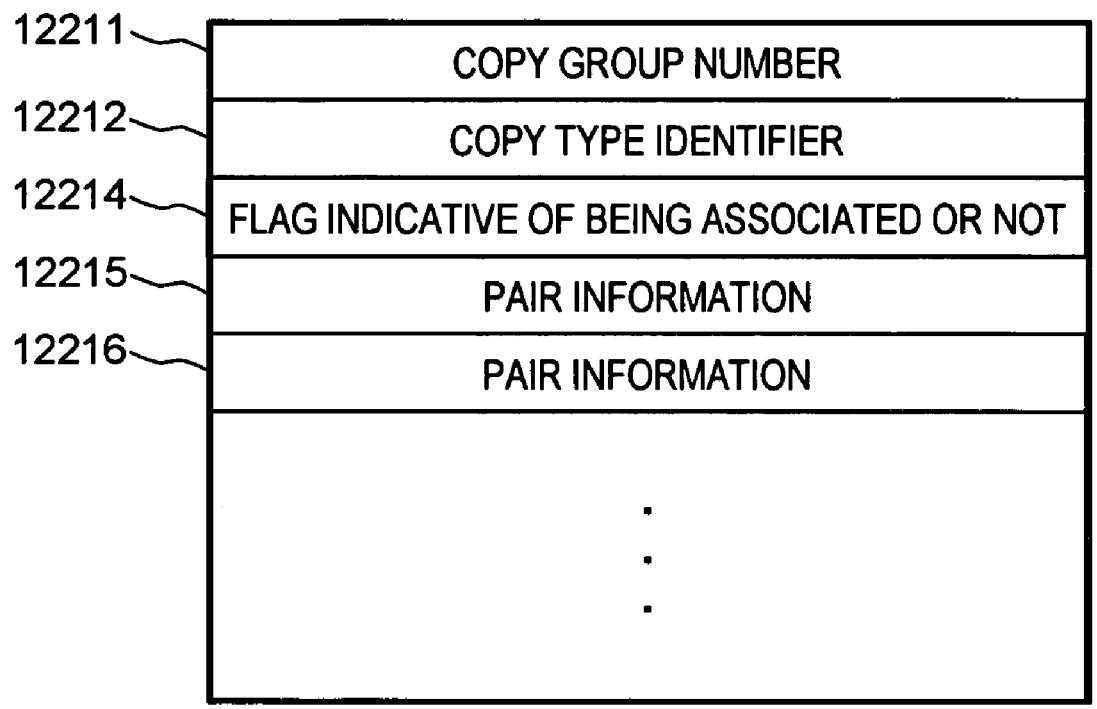
FIG. 6 is a block diagram of copy group definition information.

FIG. 6 is a block diagram of the copy group definition information 1221.

Each copy group has the copy group definition information 1221. The copy group definition information 1221 contains a copy group number 12211, a copy type identifier 12212, an associated/not associated flag 12214 indicative of being associated or not, and one or more pieces of pair information (pair information 12215, pair information 12216 . . . ).

Set as the copy group number 12211 is the identifier of the copy group that is defined by this copy group definition information 1221.

Set as the copy type identifier 12212 is the identifier of the copy type (synchronous, asynchronous, or the like) of this copy group.

The associated/not associated flag 12214 is information about whether or not another copy group is set to logical volumes to which this copy group is set. For instance, when a secondary volume that is in pair information of this copy group is a primary volume in copy group definition information of another copy group, "1" is set to the associated/not associated flag 12214. "0" is set to the associated/not associated flag 12214 when primary volumes and secondary volumes that are in pair information of this copy group are not found in copy group definition information of any other copy group.

The pair information 12215 is identifiers of a copy pair belonging to this copy group. The copy group definition information 1221 may have the pair information 12215 alone, or may have the pair information 12216 and more in addition to the pair information 12215 as shown in FIG. 6.

The copy group definition information 1221 is set in advance by an administrator or the like, and is stored in the main disk drive 120 of the host computer 100. Alternatively, the copy group definition information 1221 may be set when the command data 400 is created.

Figure 7:
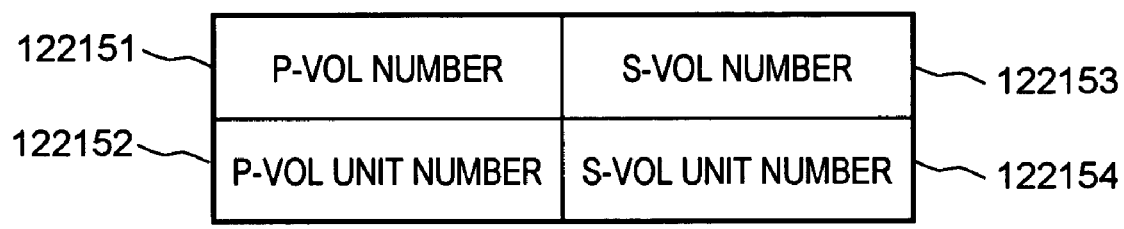
FIG. 7 is a block diagram of pair information.

FIG. 7 is a block diagram of the pair information 12215.

The pair information 12215 is information indicating which logical volumes constitute the copy pair to which this pair information 12215 is set.

The pair information 12215 contains a P-VOL number 122151, a P-VOL unit number 122152, an S-VOL number 122153, and an S-VOL unit number 122154.

Set as the P-VOL number 122151 is the identifier of the primary logical volume of this copy pair. Set as the P-VOL unit number 122152 is the identifier of the primary disk controller unit of this copy pair.

Set as the S-VOL number 122153 is the identifier of the secondary logical volume of this copy pair. Set as the S-VOL unit number 122154 is the identifier of the secondary disk controller unit of this copy pair.

The pair information 12215 is set in advance by an administrator or the like, and is stored in the main disk drive 120 of the host computer.

FIG. 8 shows data configuration of an instruction parameter 150, which is used to create a control command for copy processing. The instruction parameter is, upon instruction from a user, inputted to the host computer 100 via an input device or the host computer SVP 140.

Command specifics 15001 indicate the type of copy processing that the disk controller unit is instructed to execute. The field of the command specifics 15001 holds a pair control instruction command such as "delete pair" and "make pair".

A P-VOL parameter 15002 indicates what request is made to the P-VOL after the command specified by the command specifics 15001 is executed. Specifically, the P-VOL parameter 15002 determines whether read protect or write protect, or both, is requested. Read protect means refusal to read data out of the volume. Write protect means refusal to write data in the volume. The instruction parameter 150 designates one from "read protect on", "write protect on" and "read/write protect on".

An S-VOL parameter 15003 indicates what request is made to the S-VOL after the command specified by the command specifics 15001 is executed. Specifically, the S-VOL parameter 15003 determines whether read protect or write protect, or both, is requested. Similar to the P-VOL parameter 15002, the S-VOL parameter 15003 designates one from the three options.

A next copy instruction 15004 designates the type of next copy set to the P-VOL or the S-VOL after the command specified by the command specifics 15001 is executed. In addition to the next copy type, the next copy instruction 15004 designates a volume of a pair on which the command is executed, and whether this volume in the command target pair serves as a P-VOL or an S-VOL in the next copy. In the example of FIG. 8, "S accepts asynchronous copy (P)" is written as the next copy instruction 15004. This means that the type of the next copy accepted by the S-VOL in the command target pair is asynchronous copy, and that this S-VOL serves as a P-VOL in the next asynchronous copy.

The copy type may be omitted from the next copy instruction 15004, as in "S (P)", which is an instruction telling the current S-VOL to serve as a P-VOL in the next copy. Alternatively, which of the current volumes serves as which of a P-VOL and an S-VOL in the next copy may be omitted from the next copy instruction 15004, as in "P accepts asynchronous copy, S accepts asynchronous copy". This instruction merely instructs the current P-VOL and S-VOL to form a pair for the next asynchronous copy.

Next group information 15005 designates copy group definition information to use in determining information of a pair partner that is set as a P-VOL or an S-VOL after the command specified by the command specifics 15001 is executed. When it is not necessary to designate a next pair partner, NULL or other similar symbols can be stored as the next group information 15005 to indicate that no copy group definition information is designated. A copy type obtained from the next group information 15005 may be set as the next copy type.

Now, a description is given on specific processing of the computer system according to this invention.

Figure 9A:
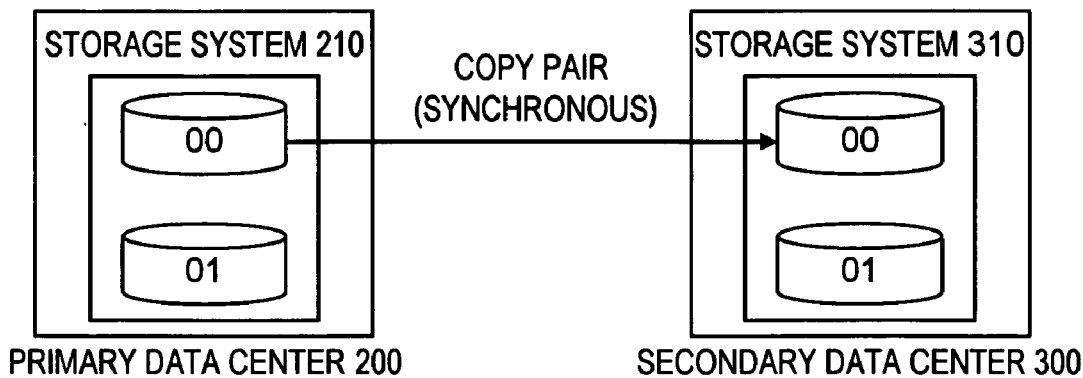
FIGS. 9A to 9C are explanatory diagrams of logical volume copy pair settings.
Figure 9B:
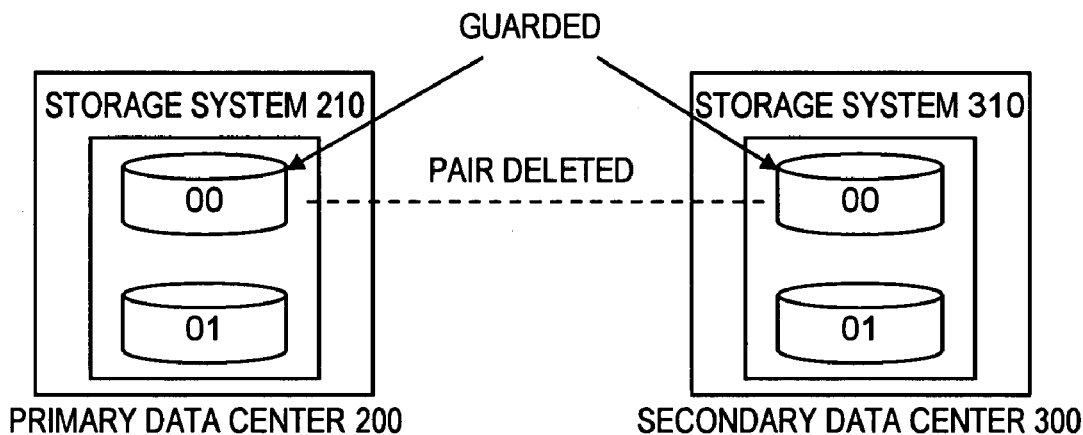
Figure 9C:
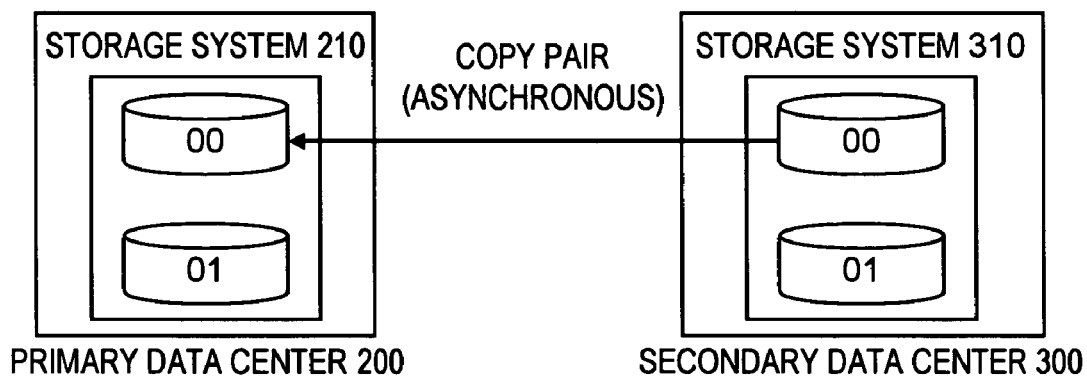

FIGS. 9A to 9C are explanatory diagrams of logical volume copy pair settings.

Shown in FIGS. 9A to 9C is a transition of copy pair settings of the logical volumes 00 and the logical volumes 01 which are set up in the storage system 210 of the primary data center 200 and in the storage system 310 of the secondary data center 300.

In the computer system shown in FIG. 9A, a synchronous copy pair is set with the logical volume 00 of the storage system 210 serving as the primary volume and the logical volume 00 of the storage system 310 serving as the secondary volume. The logical volume 01 of the storage system 210 and the logical volume 01 of the secondary data center 300 do not form a copy pair with any logical volume. Here, a copy group is made up of only one pair in order to simplify the explanation. The same processing steps that are described here are employed when a copy group has two or more copy pairs.

The description here deals with a case where the direction of copy between a pair which has originally been from the primary data center 200 toward the secondary data center 300 is temporarily reversed due to maintenance of the host computer 100, fail over upon occurrence of a failure, or the like, so the computer system is run using the secondary data center 300 as a copy source and changing synchronous copy to asynchronous copy for the duration of reverse copy from performance or other reasons.

The processing steps include deleting the copy pair once and creating an asynchronous copy pair in which the primary side and the secondary side are reversed from those of the deleted copy pair.

The host computer 100 first creates and sends the command data 400 in order to instruct deleting the copy pair.

This command data 400 contains the command parameter 410 to instruct deleting the copy pair and the ACL instruction parameter 420 to give instructions on how logical volumes in a simplex state are guarded.

The command parameter 410 is set as follows: "Delete pair" is stored as the command specifics 4101, the logical volume 00 of the storage system 210 is stored as the P-VOL 4102, and the logical volume 00 of the storage system 310 is stored as the S-VOL 4103.

The ACL instruction parameter 420 is set as follows: "Effective" is stored in the fields of the P-VOL directed instruction 4201 and the S-VOL directed instruction 4206. Therefore, guard features according to the ACL are designated for the primary and secondary logical volumes. The same guard features are applied to the primary and secondary logical volumes, with the read protect during simplex set to "off" and the write protect during simplex set to "on". This allows data read in the primary and secondary logical volumes when they are put into a simplex state while prohibiting data write.

The next copy type 4204 is set to "asynchronous copy (S)", and the logical volume 00 of the storage system 310 is set as the next pair partner 4205. As a result, the current primary logical volume, namely, the logical volume 00 of the storage system 210 serves, in the next copy, which is asynchronous copy, as (S), a secondary logical volume, and is paired with the logical volume 00 of the storage system 310 to form a new copy pair for the next asynchronous copy. The disk controller unit 320 rejects requests to create any other copy pairs.

Similarly, the current secondary logical volume, namely, the logical volume 00 of the storage system 310 serves, in the next copy, which is asynchronous copy, as (P), a primary logical volume, and is paired with the logical volume 00 of the storage system 210 to form a new copy pair for the next asynchronous copy. The disk controller unit 320 rejects requests to create any other copy pairs.

The ACL 242 is set in accordance with this ACL instruction parameter 420. The disk controller unit 320 rejects any other instructions than those set in the ACL 242.

FIG. 9B shows the state of the disk unit 270 and of the disk unit 370 after the copy pair is deleted.

Deleting the copy pair breaks up the logical volume 00 of the storage system 210 and the logical volume 00 of the storage system 310, and brings the logical volumes into a simplex state.

The ACL 242 is set for the storage system 210 and the storage system 310 in accordance with the ACL instruction parameter 420 described above. With the ACL 242 set, the logical volume 00 of the storage system 210 and the logical volume 00 of the storage system 310 are guarded.

Next, the new copy pair is formed.

The host computer 100 creates and sends the command data 400 in order to instruct to create the pair. The command data 400 may be sent by the host computer 100 connected to the primary data center 200, or by a host computer connected to another data center (the secondary data center 300, for example). It is also possible to set the command data 400 from the disk unit SVP 380 of the storage system 310.

This command data 400 contains the command parameter 410 to instruct making pair.

The command parameter 410 is set such that "make pair" is stored as the command specifics 4101, the logical volume 00 of the storage system 310 is stored as the P-VOL 4102, and the logical volume 00 of the storage system 210 is stored as the S-VOL 4103.

Receiving the command data 400, the disk controller unit 220 creates a logical volume pair in accordance with the instructions of the command parameter 410.

At this point, the ACL checking/setting module 2412 compares the instructions of the command parameter 410 against the settings of the ACL 242 to determine whether to create the logical volume pair or not. In other words, the ACL checking/setting module 2412 judges whether the instructions of the command parameter 410 are consistent with the next copy type 2425 and the next pair partner 2426 which are set in the ACL 242. When it is judged as a result that the instructions are consistent, the ACL checking/setting module 2412 gives permission to create the pair. When the instructions are not consistent, the ACL checking/setting module 2412 refuses the command to create the pair.

FIG. 9C shows the state of the disk units after the new pair is formed.

Making the new copy pair sets an asynchronous copy pair that has the logical volume 00 of the storage system 310 as the primary volume and the logical volume 00 of the storage system 210 as the secondary volume.

A disturbance (unscheduled data write or pairing with other logical volumes than those that have been planned) to logical volumes that are in a simplex state is thus prevented.

Described next is how the command data 400 is created by the host computer 100.

Figure 10:
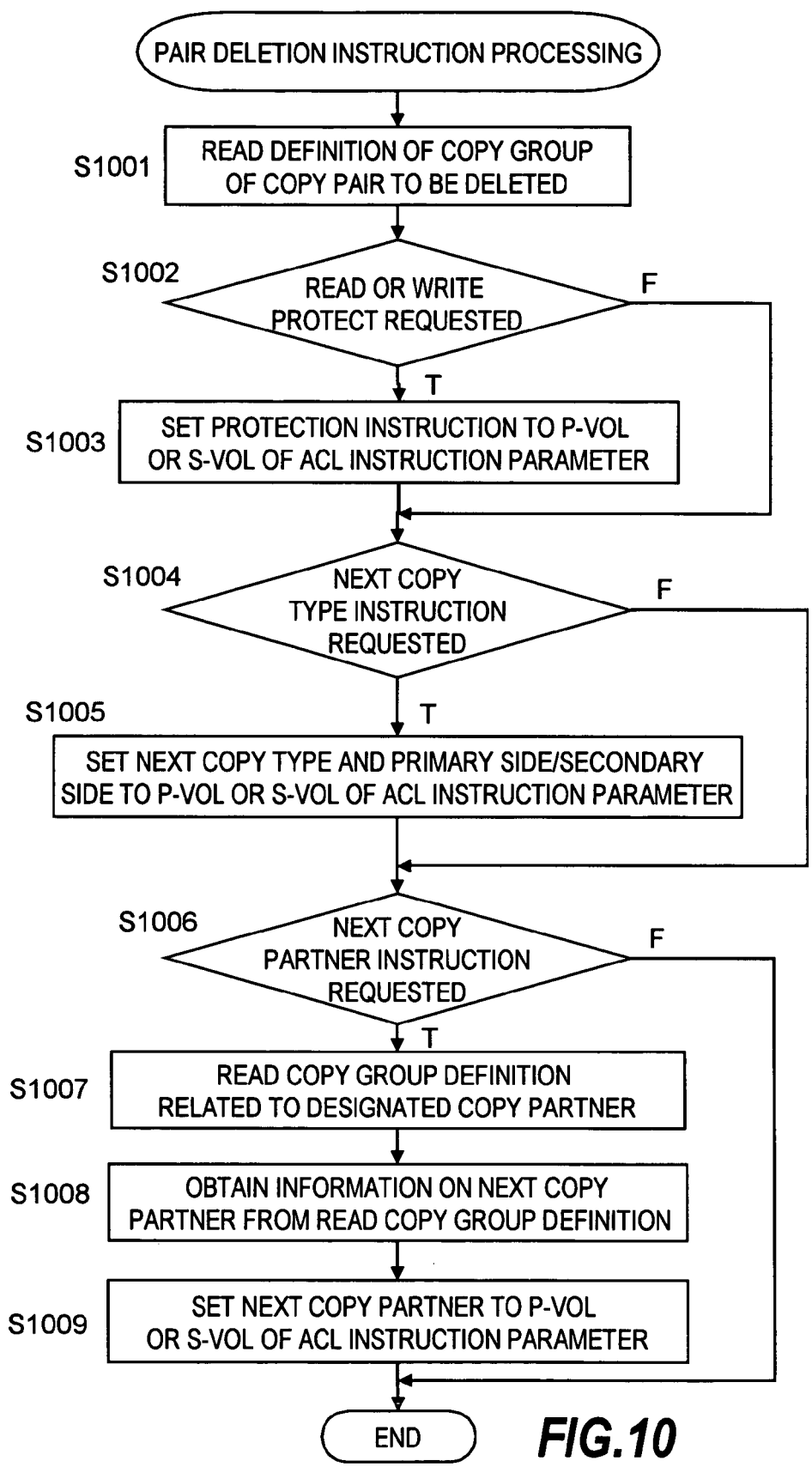
FIG. 10 is a flow chart for creating command data.

FIG. 10 is a flow chart for creating the command data 400 that instructs deleting a copy pair.

Deleting this pair instruction processing is executed by the copy management program 123.

Making pair and deleting pair are executed as a series of processing in maintenance, fail over upon occurrence of a failure, or like other situations. A program, a script or the like for executing the series of processing is executed by the CPU 110 and, as the need for deleting a copy pair instruction arises, steps of this flow chart are carried out. When carrying out the steps, an administrator or the like inputs the instruction parameter 150 which designates a command target copy group, which indicates whether to guard logical volumes or not, and which gives other instructions necessary to execute deleting the pair command.

First, a definition of a copy group that has a copy pair to be deleted by the command is read out of the copy group definition information 1221 of the data duplication configuration information 122 (S1001). From the copy group definition information 1221, the identifiers of the logical volumes that constitute the copy pair to be deleted are obtained as well as the identifier of the disk controller unit 220.

Next, it is judged whether or not at least one of read protect and write protect is requested for the logical volumes that are put into a simplex state after the copy pair is deleted (S1002). As has been described, deleting pair is executed as a part of a series of processing by a script or the like. From this script, the instruction parameter 150, which is information about the planned subsequent processing (for example, guarding logical volumes in a simplex state and making a new copy pair), is obtained and set.

When it is judged that the P-VOL parameter 15002 or the S-VOL parameter 15003 in the instruction parameter 150 requests at least one of read protect and write protect, the requested protect is set to the corresponding logical volume in the ACL instruction parameter 420 (S1003).

In the case where write protect, for example, is set to a logical volume, the write protect during simplex 4203 of the ACL instruction parameter 420 is set to "on".

When it is judged that neither read protect nor write protect is requested, the processing moves to a step S1004 without executing the step S1003.

In the step S1004, it is judged from the next copy instruction 15004 of the instruction parameter 150 whether there is a request to designate the type of the next copy or not.

When it is judged that there is a request to designate a next copy type, the requested copy type is set to the corresponding logical volume in the ACL instruction parameter 420 (S1005). For example, in the case where the next copy type requested is asynchronous copy with this logical volume serving as the primary volume, "asynchronous copy (P)" is set as the copy type 4204.

When it is judged that there is no request to designate a next copy type, the processing moves to a step S1006 without executing the step S1005.

In the step S1006, whether there is a request to designate a next copy partner or not is judged from the next group information 15005 of the instruction parameter 150. The existence or absence of a request to designate a next copy partner is judged for the primary logical volume and the secondary logical volume each.

When it is judged that there is a request to designate a next copy partner, first, copy group information related to the copy partner that is designated for the corresponding logical volume is read out of the data duplication configuration information 122 (S1007). For instance, in the case where the instruction parameter 150 has a description "1" as the next group information 15005, the copy group definition information 1221 that has "1" as the copy group number 12211 is read.

From the read copy group definition information 1221, information of the next copy partner, specifically, the identifier of the logical volume that is the next copy partner and the identifier of the disk controller unit that controls this logical volume are obtained (S1008).

The obtained information is set as the next copy partner of the corresponding logical volume in the ACL instruction parameter 420 (S1009). In the case where the next copy partner of the primary volume (P-VOL) is the logical volume "00" of the disk controller unit 320 "B", "disk controller unit 'B', logical volume '00'" is set to the next pair partner 4205.

The ACL instruction parameter 420 of the command data 400 is created through the processing of this flow chart.

Processing of the disk controller unit 220 upon reception of the command data 400 will be described next.

Figure 11:
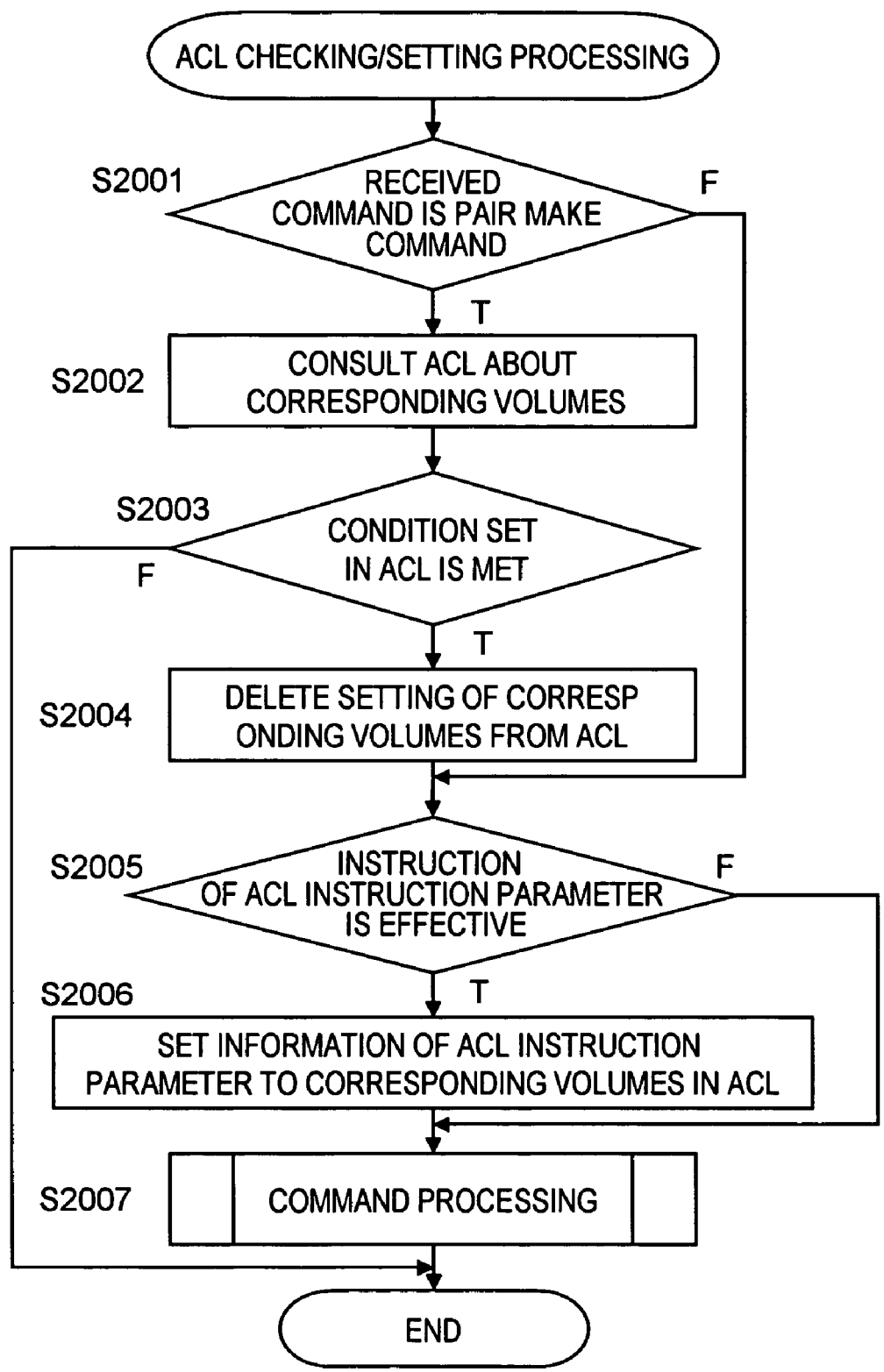
FIG. 11 is a flow chart of processing by an ACL checking/setting module.

FIG. 11 is a flow chart of the ACL checking/setting module 2412 upon reception of the command data 400.

This processing is executed by the ACL checking/setting module 2412.

As described above, the command data 400 transmitted from the host computer 100 is sent to the copy processing module 241 via the I/F 250 of the disk controller unit 220.

The command receiving module 2411 of the copy processing module 241 analyzes the received command data 400, and then sends the command parameter 410 and the ACL instruction parameter 420 which are contained in the command data 400 to the ACL checking/setting module 2412. Obtaining the command parameter 410 and the ACL instruction parameter 420, the ACL checking/setting module 2412 executes the following processing:

The ACL checking/setting module 2412 first consults the command specifics 4101 of the command parameter 410 to judge whether the received command instructs to create a pair or not (S2001).

When the received command is judged as a pairing command, the ACL checking/setting module 2412 obtains the identifier of a logical volume of the disk controller unit 220 to which the ACL checking/setting module 2412 belongs out of information designated in the command parameter 410. Then the ACL checking/setting module 2412 obtains the ACL 242 that concerns this logical volume (S2002).

When it is judged that the received command is not a pairing command, the processing moves to a step S2005 without executing the steps S2002 through S2004.

Judged next is whether or not instructions of the command parameter 410 meet conditions set in the ACL 242 that concerns this logical volume (S2003). Specifically, the ACL checking/setting module 2412 judges whether or not the copy pair type and the copy partner that are designated by the command parameter 410 match the next copy type 2425 and the next pair partner 2426 that are set in the ACL 242.

When it is judged that the instructions of the command parameter 410 do not meet the conditions set in the obtained ACL 242, the processing is terminated. The error of the command is registered in the control memory 240.

When it is judged that the instructions of the command parameter 410 meet the conditions set in the obtained ACL 242, the processing moves to the step S2004.

In the step S2004, first, settings regarding this logical volume are deleted from the ACL 242.

Next, the ACL checking/setting module 2412 judges whether or not the ACL instruction parameter 420 of the command data 400 is set such that instructions directed to the logical volume of the disk controller unit 220 to which the ACL checking/setting module 2412 belongs are effective (S2005).

When it is judged that instructions to the logical volume of the disk controller unit 220 are set effective, the ACL checking/setting module 2412 sets the instructions of the ACL instruction parameter 420 to the items of this logical volume in the ACL 242 (S2006).

When it is judged that instructions to the logical volume of the disk controller unit 220 are not set effective, the processing moves to a step S2007 without executing the step S2006.

In the step S2007, the command parameter 410 of the command data 400 is sent to the command processing module 2413. The command processing module 2413 executes command processing based on this command parameter 410.

Through the command processing, the instruction of the command parameter 410 (e.g., make pair or delete pair) is executed.

After the command processing is completed, the processing of this flow chart is ended.

A requested command is processed and the ACL 242 is set through the processing described above with reference to the flow chart. In the case of a request to create a logical volume pair, for example, the copy processing module decides to execute the pairing request only when the settings of the ACL 242 are met.

Figure 12:
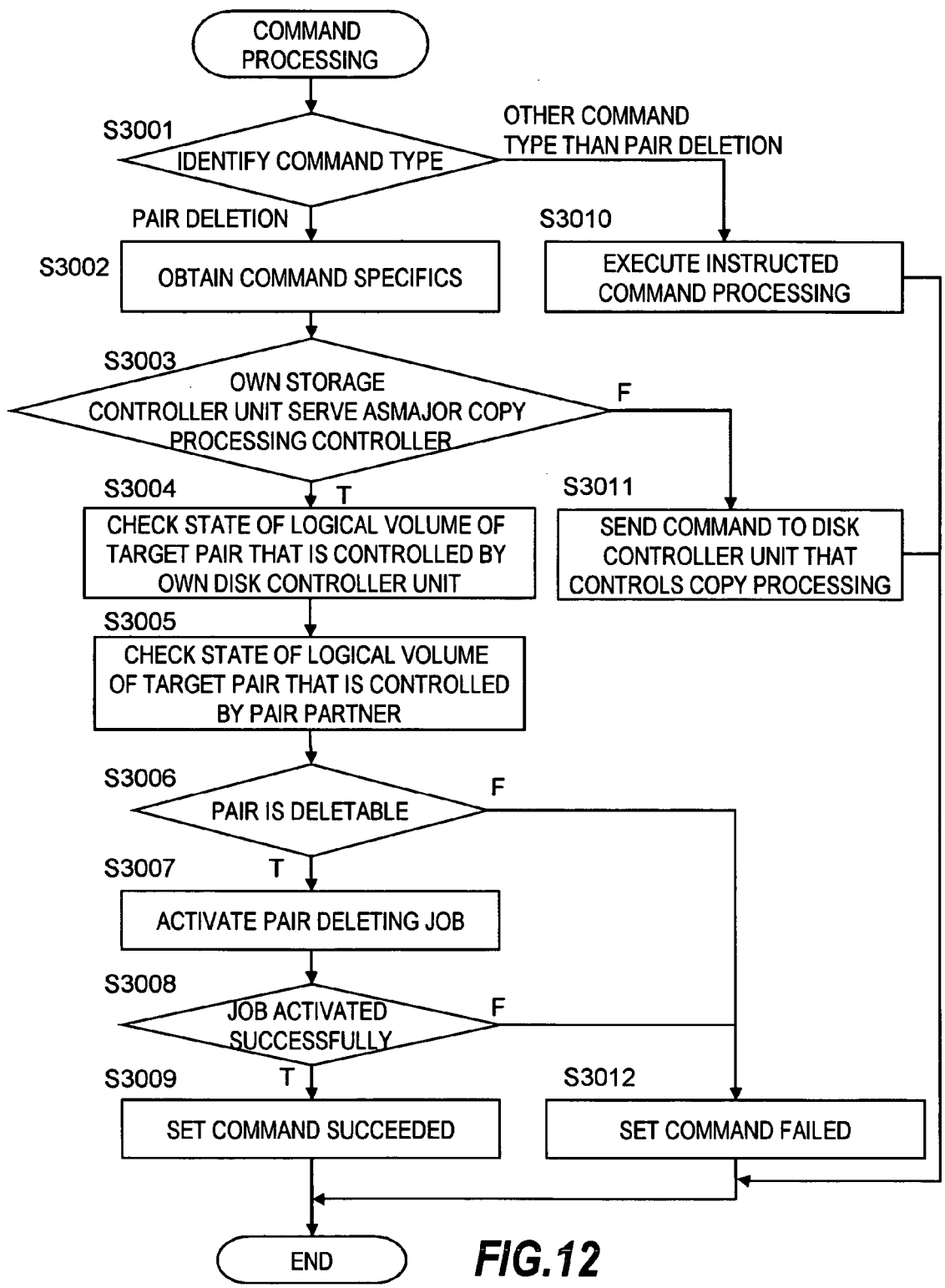
FIG. 12 is a flow chart of command processing.

FIG. 12 is a flow chart of the command processing in the step S2007 of FIG. 11.

This processing is executed by the command processing module 2413.

First, the command processing module 2413 consults the received command parameter 410 to identify the type of the command (S3001).

When the command type is identified as delete pair, the processing moves to a step S3002. When the command type is identified as other types than deleting pair, the processing moves to a step S3010.

In the step S3010, command processing according to instructions of the command parameter 410 is executed. In the case of making a copy pair command, for example, the status of the designated primary logical volume and secondary logical volume is changed to "copy pair". This status is set to the control memory 240.

In the step S3002, the command processing module 2413 obtains the command parameter 410.

Next, the command processing module 2413 judges whether the disk controller unit 220 to which it belongs is a major copy processing controller or not (S3003).

A major copy processing controller is a disk controller unit that takes a major part in copy pair processing in a computer system constituted of plural disk controller units.

The host computer 100 sends the command data 400 to the disk controller unit 220 of the primary data center 200 to which the host computer 100 is directly connected. The disk controller unit 220, when serving as the major copy processing controller, processes the received command data 400. On the other hand, when the disk controller unit 220 of the primary data center 200 is not set as the major copy processing controller, the disk controller unit 220 sends the received command data 400 to a disk controller unit that is set as the major copy processing controller (for example, the disk controller unit 320 of the secondary data center 300). Then the disk controller unit 320 performs a step S3004 and subsequent steps of the processing in accordance with the received command.

When the command processing module 2413 judges that the disk controller unit 220 to which it belongs is serving as the major copy processing controller, the processing moves to the step S3004. When the command processing module 2413 judges that the disk controller unit 220 is not serving as the major copy processing controller, the processing moves to a step S3011.

In the step S3011, the command parameter 410 is sent via the I/F 250 to the disk controller unit that is set as the major copy processing controller. This terminates the processing and is followed by return to the steps in the flow chart of FIG. 11.

In the step S3004, the identifier of the designated logical volume of the disk controller unit 220 is retrieved from the obtained command. Then the state of this logical volume is checked. Specifically, the command processing module 2413 judges whether or not this logical volume is in the same copy pair state that is designated by the command parameter 410. Whether this copy pair is deletable or not is also judged.

The command processing module 2413 next obtains the identifier of the logical volume of the disk controller unit 320 that is designated as the pair partner by the command. Then the state of this logical volume is checked (S3005). Specifically, the command processing module 2413 sends, via the I/F 250, an inquiry command to ask the disk controller unit 320 about the state of this logical volume. Receiving a response to the inquiry command, the command processing module 2413 judges whether or not this logical volume is in the same copy pair state that is designated by the command parameter 410. Whether this copy pair is deletable or not is also judged.

Next, the command processing module 2413 judges whether the pair designated by the command is deletable or not (S3006). Specifically, the command processing module 2413 judges, from the results of checking in the steps S3004 and S3005, whether the same copy pair as the one designated by the command parameter 410 is set or not and whether this pair is deletable or not.

When the pair is judged as deletable, the processing moves to a step S3007. When it is judged that the pair is not deletable, the processing moves to a step S3012.

In the step S3012, error of the command is registered in the control memory 204. This terminates the processing and is followed by return to the steps in the flow chart of FIG. 11.

Figure 13:
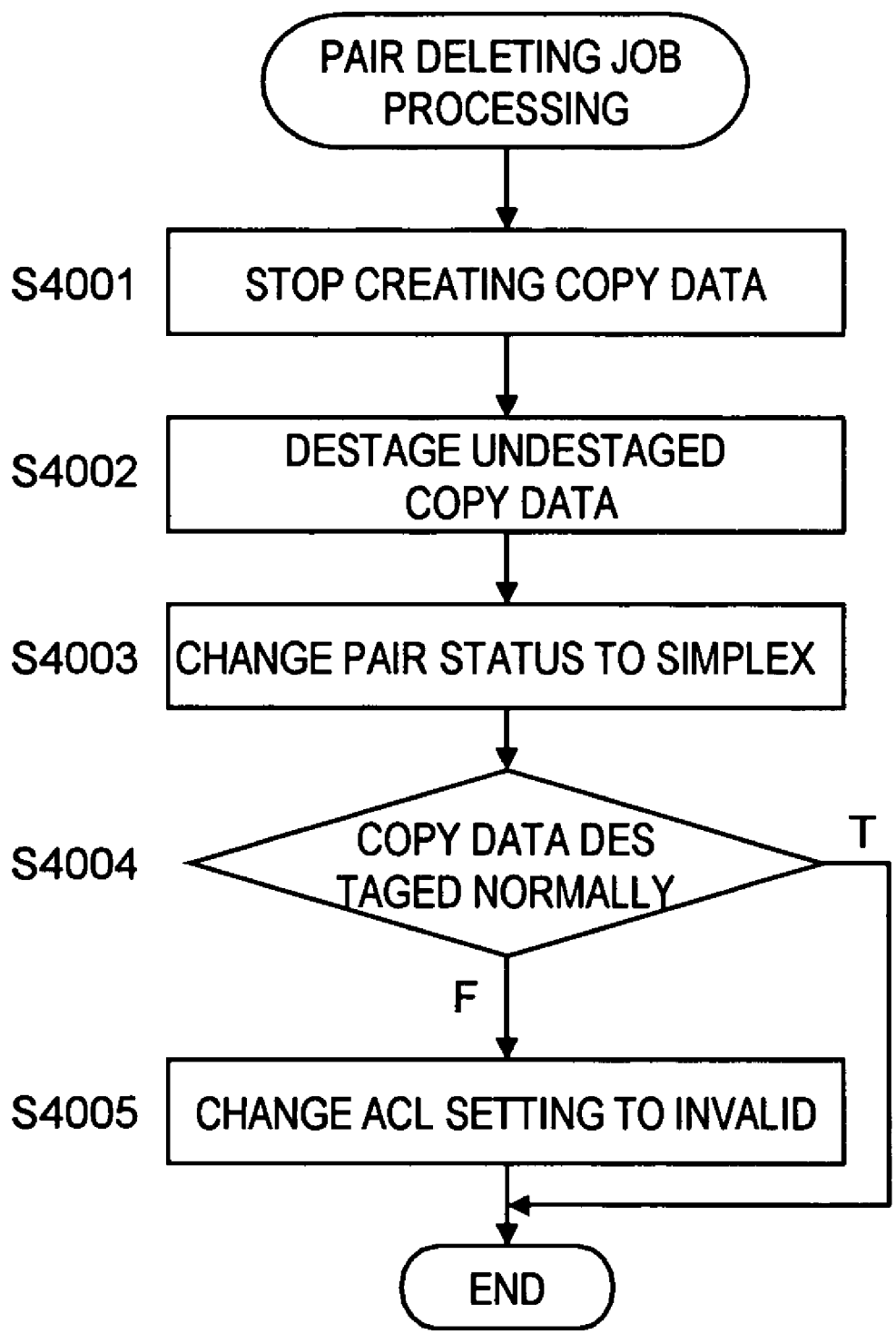
FIG. 13 is a flow chart of a pair deleting job.

In the step S3007, deleting a pair job, which will be described with reference to FIG. 13, is activated. Deleting the pair job executes deleting the pair.

Next, whether or not deleting the pair job has been activated successfully is judged (S3008).

When it is judged that deleting the pair job has been activated successfully, the processing moves to a step S3009, where the success of the command is registered in the control memory 240. This ends the processing and is followed by return to the steps in the flow chart of FIG. 11.

When it is judged that activation of deleting the job has failed, the processing moves to a step S3012, where the error of the command is registered in the control memory 240. This ends the processing and is followed by return to the steps in the flow chart of FIG. 11.

Through the processing described above with reference to the flow chart, instructions of the command parameter 410 are executed.

FIG. 13 is a flow chart of deleting the pair job in the step S3007 of FIG. 12.

The processing of this flow chart is executed as a subroutine of the command processing of FIG. 12 by the command processing module 2413.

The first step the command processing module 2413 takes after deleting the pair job is activated is to halt creation of copy data of the copy pair on which the processing is performed (S4001).

At the time deleting the pair job is booted, copy data creation, namely, transmission of copy data from the primary logical volume to the secondary logical volume is being performed in accordance with an I/O request from the host computer 100. The command processing module 2413 stops accepting the I/O request, and thus brings the copy data transmission to a stop.

Next, copy data of the primary logical volume that is not destaged yet is sent to the secondary logical volume to be destaged (S4002). In the case where the copy pair is an asynchronous copy pair, in particular, the primary volume has copy data that is yet to be destaged to the secondary volume at the time the copy data transmission is halted. Through this processing, all the undestaged copy data is destaged to the secondary volume.

The command processing module 2413 then changes the status of each logical volume of the copy pair to a simplex state (S4003). This processing deletes the copy pair and brings the two logical volumes into a simplex state. The simplex status is registered in the control memory 240.

The next step is to judge whether or not the processing of the steps S4001 through S4003 has been completed normally thereby successfully destaging the copy data and putting the logical volumes into a simplex state (S404).

When it is judged that the processing has been completed normally, the processing is ended and the processing of the flow chart of FIG. 12 is resumed.

When it is judged that the processing has not been completed normally, the command processing module 2413 consults the settings-effective-when condition 4211 of the ACL instruction parameter 420. In the case where "command is successful" is set as the condition 4211, items of the ACL 242 concerning the logical volume to which the instructions are directed are made invalid (S4005).

When "command is successful" is set as the condition 4211, the settings of the ACL 242 are effective only when the command has succeeded. Therefore, when the command has failed, the settings of the ACL 242 that are set for this logical volume in the step S2006 of FIG. 11 are made invalid.

The processing of the step S4005 is for avoiding inconsistencies in logical volume access settings which are caused when, for example, guarding according to the ACL 242 is set effective despite error of deleting a pair command. When a command has failed, guarding of the logical volume according to the ACL 242 is set invalid and the error of the command is registered in the control memory.

As the processing of the step S4005 is ended, the processing of the flow chart of FIG. 12 is resumed.

Deleting copy pair is executed through the processing described above with reference to the flow chart.

As has been described in the computer system of this embodiment, the host computer 100 instructs to delete a copy pair while designating the state of the logical volumes when they are in a simplex state and information of the next copy pair. With the logical volume state and next copy pair information designated, the logical volumes are guarded. The guard prevents a disturbance (unscheduled data write or pairing with other logical volumes than those that have been planned) to the logical volumes which have been a copy pair but now are broken up and in a simplex state. Thus the data consistency in the computer system is maintained and the computer system can have an improved reliability.

In addition, since the ACL 240 is sent concurrently with deleting copy pair, copy pair control and guard control to guard simplex state logical volumes can be managed at once. Accordingly, a hole in settings such as a setting miss that allows accidental access can be prevented.

How logical volumes are to be guarded is instructed in this embodiment at the time deleting a pair command is issued, but the instruction may be timed with other events. For instance, an instruction on how logical volumes which are put into a simplex state by a planned subsequent deleting copy pair request are to be guarded may be given when making a copy pair command, suspending a copy pair command, resynchronizing a copy pair command or the like is issued.

Deleting copy pair in this embodiment puts primary and secondary logical volumes into a simplex state. Alternatively, a copy pair may be deleted such that the secondary logical volume of the pair remains. Since a secondary logical volume of a copy pair receives copy data only from a paired primary logical volume, removing the primary logical volume alone from the copy pair equals the guarded state in which other commands are not accepted.

In this embodiment, a next copy type and a next copy partner are set as guard, and the guard is cancelled when a command that meets the two conditions is issued. Alternatively, an identifier may be set to a command so that the ACL instruction parameter 420 designates the identifier and the designated identifier is set in the ACL 242. A command is executed only when its identifier matches the one set in the ACL 242.

Next, a description is given on a modified example of this embodiment.

Figure 14A:
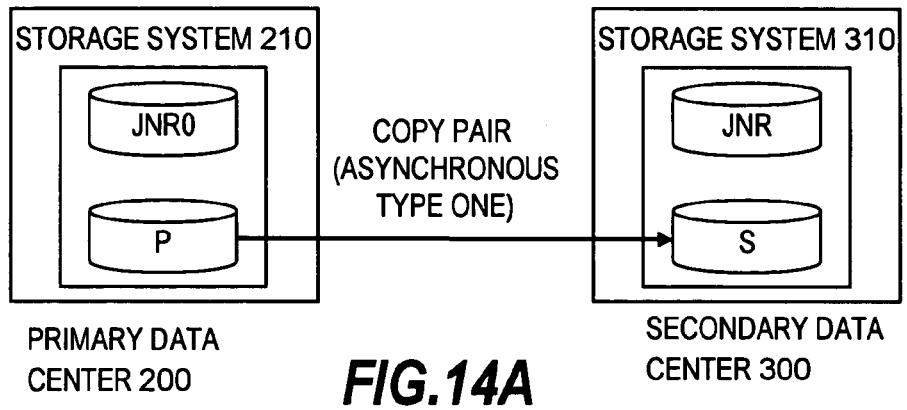
FIGS. 14A to 14C are explanatory diagrams showing a modified example of logical volume copy pair settings.
Figure 14B:
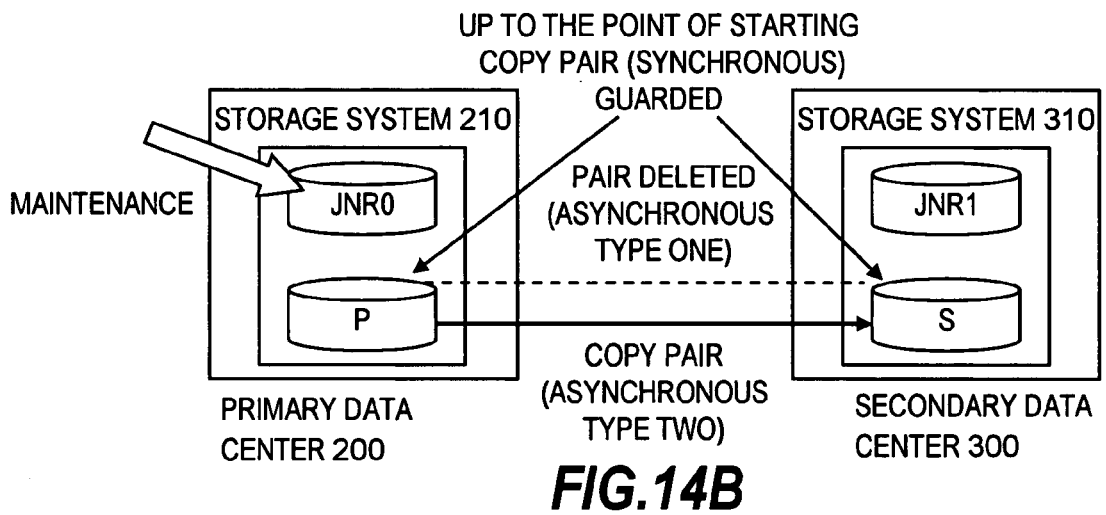
Figure 14C:
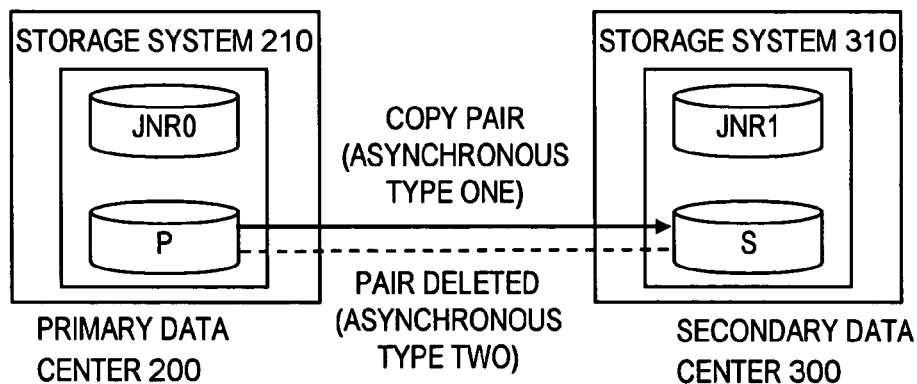

FIGS. 14A to 14C are explanatory diagrams showing a modified example of logical volume copy pair settings.

FIGS. 14A to 14C show a transition of settings of a copy pair formed from two of logical volumes JNR0, JNR1, P, and S which are set up in the disk unit 270 of the storage system 210 in the primary data center 200 and the disk unit 370 of the storage system 310 in the secondary data center 300.

Described here is an application of this invention to a case of operating an asynchronous type 1 (asynchronous remote copy that uses a volume called a journal) remote copy pair in a computer system that has two remote copy features, one of which is the asynchronous type I remote copy and the other of which is asynchronous type 2 remote copy which uses no journal. Specifically, a case of conducting maintenance on a journal logical volume is described.

In FIG. 14A, an asynchronous copy pair of asynchronous type 1 is set between the logical volume P of the storage system 210 and the logical volume S of the storage system 310 with the volume P as the primary volume and the volume S as the secondary volume.

This asynchronous remote copy uses, for remote copy control, the logical volume JNR0 of the storage system 210 and the logical volume JNR1 of the storage system 310.

The disk controller unit 220 of the storage system 210 creates, when data that is stored in the logical volume P and to be copied by remote copy is updated, a journal based on the update. The created journal is stored in the logical volume JNR0. The journal in the logical volume JNR0 is copied to the logical volume JNR1 of the secondary data center 300 by the asynchronous copy feature. The disk controller unit 320 of the storage system 310 destages, to the logical volume "S", data of the journal copied to the logical volume JNR1. As a result, the updated data of the logical volume "P" in the primary data center 200 is destaged to the logical volume "S" in the secondary data center 300.

Now, a description is given on how the remote copy pair operates when maintenance is conducted on the logical volume JNR0 which stores a journal. Maintenance of a logical volume is, for example, changing the capacity of the logical volume or replacing the logical volume with another logical volume.

Here, first, the copy pair set such that the logical volumes JNR0 and JNR1 are used in remote copy is deleted once.

The host computer 100 first creates and sends the command data 400 in order to instruct deleting the pair.

This command data 400 contains the command parameter 410 that instructs deleting the pair and the ACL instruction parameter 420 that gives instructions on how logical volumes in a simplex state are guarded and designates next copy pair information.

The command parameter 410 is set as follows:

"Delete pair" is stored as the command specifics 4101, the logical volume P of the storage system 210 is stored as the P-VOL 4102, and the logical volume S of the storage system 310 is stored as the S-VOL 4103.

The ACL instruction parameter 420 is set as follows:

"Effective" is stored in the fields of the P-VOL directed instruction 4201 and the S-VOL directed instruction 4206. Therefore, guard features are designated for the primary and secondary logical volumes. As the guard features, the read protect during simplex is set to "off" and the write protect during simplex is set to "on". This allows data read in the primary and secondary logical volumes when they are put into a simplex state while prohibiting data write.

The next copy type 4204 for P-VOL is set to "asynchronous copy type 2 (P)", the logical volume S of the storage system 310 is set as the next pair partner 4205 for P-VOL, the next copy type 4209 for S-VOL is set to "asynchronous copy type 2 (S)", and the logical volume P of the storage system 210 is set as the next pair partner 4210 for S-VOL.

The ACL 242 and the ACL 342 are set in accordance with the ACL instruction parameter 420. Any other instructions than those set in the ACL 242 and the ACL 342, for example, data write in the logical volume S during deleting pair, are rejected.

The host computer 100 then creates and sends the command data 400 that instructs making pair in order to form an asynchronous type 2 copy pair from the logical volumes P and S.

This command data 400 contains the command parameter 410 that instructs to create the asynchronous type 2 copy pair.

FIG. 14B shows the state of the computer system after the asynchronous type 1 copy pair is deleted and the asynchronous type 2 copy pair is formed.

The logical volume JNR0 and the logical volume JNR1 are not in use since the pair is deleted.

The logical volume P and the logical volume S are making the asynchronous type 2 copy pair.

In this state, maintenance of the logical volume JNR0 is carried out.

After the maintenance is finished, the asynchronous type 2 pair is deleted and the asynchronous type 1 pair is formed in order to restore the original pair state.

The host computer 100 first creates and sends the command data 400 in order to instruct deleting the asynchronous type 2 pair.

This command data 400 contains the command parameter 410 that instructs deleting the pair and the ACL instruction parameter 420 that gives instructions on how logical volumes in a simplex state are guarded and designates next copy pair information.

The command parameter 410 is set as follows:

"Delete Pair" is stored as the command specifics 4101, the logical volume P of the storage system 210 is stored as the P-VOL 4102, and the logical volume S of the storage system 310 is stored as the S-VOL 4103.

The ACL instruction parameter 420 is set as follows:

"Effective" is stored in the fields of the P-VOL directed instruction 4201 and the S-VOL directed instruction 4206. Therefore, guard features are designated for the primary and secondary logical volumes. As the guard features, the read protect during simplex is set to "off" and the write protect during simplex is set to "on". This allows data read in the primary and secondary logical volumes when they are put into a simplex state while prohibiting data write.

The next copy type 4204 for P-VOL is set to "asynchronous copy type 1 (P)", the logical volume S of the storage system 310 is set as the next pair partner 4205 for P-VOL, the next copy type 4209 for S-VOL is set to "asynchronous copy type 1 (S)", and the logical volume P of the storage system 210 is set as the next pair partner 4210 for S-VOL.

The ACL 242 and the ACL 342 are set in accordance with the ACL instruction parameter 420. Any other instructions than those set in the ACL 242 and the ACL 342, for example, data write in the logical volume S during deleting pair, are rejected.

The host computer 100 then creates and sends the command data 400 that instructs making pair in order to form an asynchronous type 1 copy pair using the JNL0 and JNL1 from the logical volumes P and S.

This command data 400 contains the command parameter 410 that instructs to create the asynchronous type 1 copy pair.

FIG. 14C shows the state of the computer system after the asynchronous type 2 copy pair is deleted and the asynchronous type 1 copy pair is formed.

As a result, the same copy pair that is shown in FIG. 14A is restored and remote copy using a journal can now be resumed.

In this way, conducting maintenance on a hardware resource such as a journal logical volume is made possible in a computer system in which asynchronous remote copy using a journal is set. By using other copy feature than the one that involves the use of a journal to continue remote copy during a maintenance period, data consistency in the computer system is retained and the computer system can have an improved reliability. In addition, this method ensures successful switching over to the other copy feature, thereby enhancing the reliability of the computer system even more.

Another modified example is described next.

The descriptions given above are about logical volume copy pair settings in a computer system that has two data centers (the primary data center 200 and the secondary data center 300) as shown in FIG. 1. However, this invention is also applicable to a computer system that has more than two data centers.

The modified example described below is an application of this invention to a computer system that has three data centers. Described in this modified example is a case in which a failure occurs in a part of the computer system and copy pair settings set in the computer system are changed for recovery from the failure (fail over).

Figure 15A:
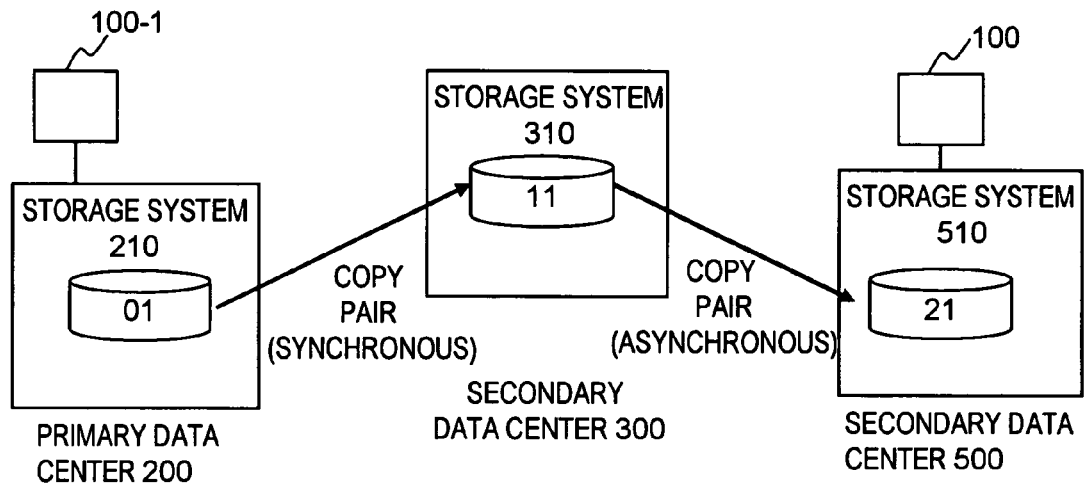
FIGS. 15A and 15B are block diagrams of a computer system having a cascade configuration.

FIG. 15A is a block diagram of a computer system having a cascade configuration that is constituted of three data centers.

A logical volume 01 of a disk unit 270 in a storage system 210 of a primary data center 200 and a logical volume 11 of a disk unit 370 in a storage system 310 of a secondary data center 300 form a synchronous copy pair. The logical volume 11 of the disk unit 370 in the storage system 310 of the secondary data center 300 and a logical volume 21 of a disk unit 570 in a storage system 510 of a secondary data center 500 form an asynchronous copy pair. A configuration in which copy pairs are linked as this is called a cascade configuration.

The storage system 210, the storage system 310 and the storage system 510 have the same configuration.

Now, a case in which a failure has occurred only in a host computer 100 that is connected to the primary data center 200 (a host computer 101).

When a failure occurs in the host computer 100-1 alone, the disk unit 270 of the primary data center 200 connected to the host computer 101-1 is operable. Then, in order to execute fail over of the computer system, the copy pair settings are changed as follows:

(1) The synchronous copy pair formed between the logical volume 01 of the disk unit 270 in the storage system 210 of the primary data center 200 and the logical volume 11 of the disk unit 370 in the storage system 310 of the secondary data center 300 is deleted.

(2) The asynchronous copy pair formed between the logical volume 11 of the disk unit 370 in the storage system 310 of the secondary data center 300 and the logical volume 21 of the disk unit 570 in the storage system 510 of the secondary data center 500 is deleted.

(3) A new asynchronous copy pair is formed between the logical volume 21 of the disk unit 570 in the storage system 510 of the secondary data center 500 and the logical volume 01 of the disk unit 270 in the storage system 210 of the primary data center 200.

These instructions are issued by a host computer 100 that is connected to the secondary data center 300, or a host computer 100 that is connected to the secondary data center 500, or other host computer in place of the downed host computer 100-1 which is connected to the primary data center 200.

First, for the processing of (1), the host computer 100 sends command data 400 to the disk controller unit 320 of the secondary data center 300. This command data 400 contains a command parameter 410 that instructs deleting the pair and an ACL instruction parameter 420 that gives instructions on how logical volumes in a simplex state are guarded and designates next copy pair information.

The ACL instruction parameter 420 in this case is as follows:

"Effective" is stored in the field of a P-VOL directed instruction 4201. This instructs to set guard to the primary logical volume, namely, the logical volume 01. As the guard feature, read protect during simplex 4202 is set to "off" and write protect during simplex 4203 is set to "on". This allows data read in the logical volume 01 when it is put into a simplex state while prohibiting data write.

A next copy type 4204 is set to "asynchronous copy (S)", and the logical volume 21 of the storage system 510 is set as a next pair partner 4205. As a result, the logical volume 01 is paired, in the next copy, which is asynchronous copy, with the logical volume 21 of the storage system 510, and serves as (S), the secondary volume, in the next asynchronous copy.

An ACL 242 is set from this ACL instruction parameter 420, and thus guard settings for the logical volume 01 are set.

Next, for the processing of (2), the host computer 100 sends the command data 400 to the disk controller unit 320 of the secondary data center 300. This command data 400 contains the command parameter 410 that instructs deleting the pair and the ACL instruction parameter 420 that gives instructions on how logical volumes in a simplex state are guarded and designates next copy pair information.

The ACL instruction parameter 420 in this case is as follows:

"Effective" is stored in the field of an SP-VOL directed instruction 4201. This instructs to set guard to the secondary logical volume, namely, the logical volume 21. As the guard feature, read protect during simplex 4202 is set to "off" and write protect during simplex 4203 is set to "on". This allows data read in the logical volume 01 when it is put into a simplex state while prohibiting data write.

A next copy type 4204 is set to "asynchronous copy (P)", and the logical volume 01 of the storage system 210 is set as a next pair partner 4205. As a result, the logical volume 21 is paired, in the next copy, which is asynchronous copy, with the logical volume 01 of the storage system 210, and serves as (P), the primary volume, in the next asynchronous copy.

An ACL 242 is set from this ACL instruction parameter 420, and thus guard settings for the logical volume 21 are set.

Through the processing of (1) and (2), the unstable volume pair state can be guarded from the moment the failure has occurred until fail over is completed.

Next, for the processing of (3), the host computer 100 sends the command data 400 to the disk controller unit 320 of the secondary data center 300. This command data 400 contains the command parameter 410 that instructs making pair.

The command parameter 410 in this case is as follows:

"Make pair" is stored as command specifics 4101, the logical volume 21 of the disk unit 570 connected to the disk controller unit 520 is stored as P-VOL 4102, and the logical volume 01 of the disk unit 270 connected to the disk controller unit 220 is stored as S-VOL 4103.

Figure 15B:
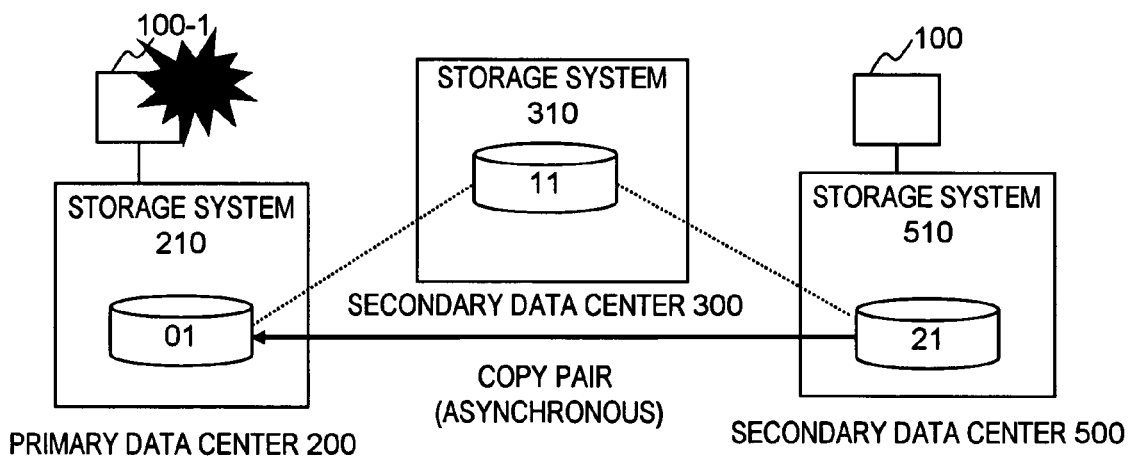

As a result of the processing of (1), (2), and (3), the computer system obtains the configuration shown in FIG. 15B. In other words, the logical volume 21 of the disk unit 570 in the secondary data center 500 and the logical volume 01 of the disk unit 270 in the primary data center 200 form an asynchronous copy pair. Thus, the data of the logical volume 01 in the primary data center 200 is recovered with the use of the data of the logical volume 21 in the secondary data center 500 that has been kept by asynchronous copy.

In this way, fail over can be executed when a failure occurs in the host computer 100 connected to the primary data center 200.

When executing the processing of (2), the host computer 100 consults copy group definition information 1221 of data duplication configuration information 122. In this modified example, the data duplication configuration information 122 also contains copy group association definition information 1222.

Figure 16:
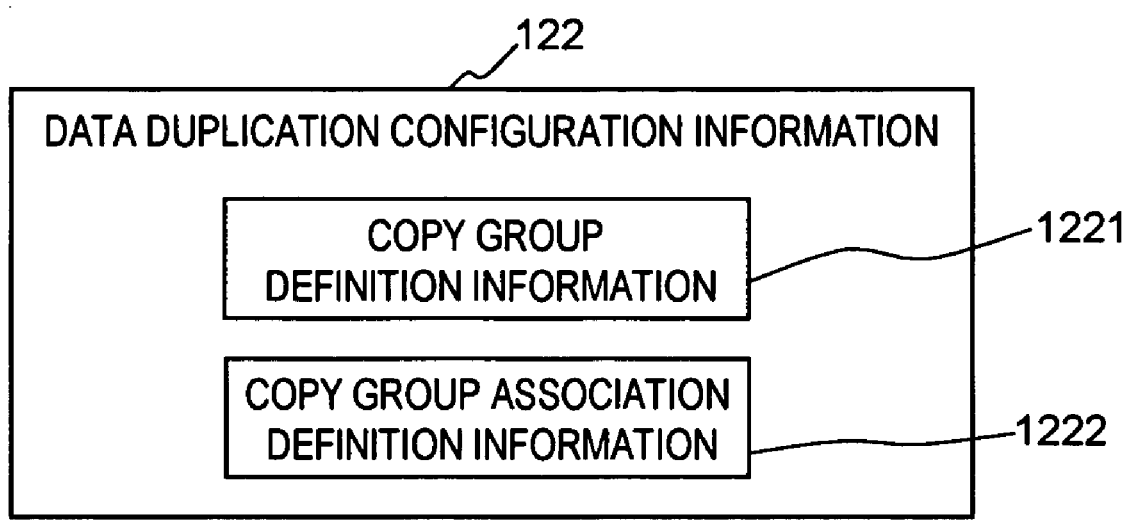
FIG. 16 is a block diagram of a modified example of data duplication configuration information.
Figure 17:
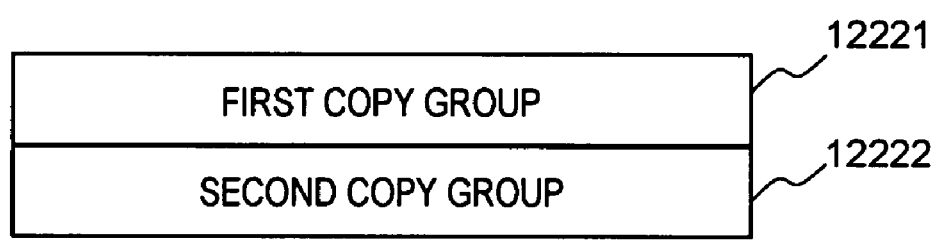
FIG. 17 is a block diagram of copy group association definition information.

FIG. 16 is a block diagram of the data duplication configuration information 122 according to this modified example, and FIG. 17 is a block diagram of the copy group association definition information 1222.

The copy group association definition information 1222 stores the identifier of a copy group (a first copy group) and the identifier of another copy group (a second copy group) that is associated with the first copy group. The copy group association definition information 1222 is set in advance by an administrator, and is stored in the data duplication configuration information 122.

When the command data 400 for deleting pair is created in the processing of (2), the host computer 100 consults an associated/not associated flag 12214 in the copy group definition information 1221 of the copy group that contains the pair to be deleted. In the case where the flag is "1", it means that this copy group has an associated copy group. Then the copy group association definition information 1222 is consulted to judge whether the copy group containing the copy pair that is formed by the logical volume 11 and the logical volume 21 and is requested to be deleted has an associated copy group or not. When it is judged that there is an associated copy group, in other words, when there is another copy group containing the pair of the logical volume 11 and the logical volume 21, information of this copy group is obtained. The obtained information is used to execute the processing of (3).

More specifically, the copy group definition information 1221 is read in the step S1007 of deleting the pair instruction processing described above with reference to FIG. 10. At this point, the copy group association definition information 1222 is read if it has been set. The read copy group association definition information 1222 is stored in a main disk drive 120 to be used in the processing of (3).

After the processing of (2) is completed, the copy group association definition information 1222 stored in the main disk drive 120 is used to execute the processing (3), namely, to create the command data 400.

By setting the copy group association definition information 1222 in advance, the host computer 100 can obtain the accurate next copy pair information in fail over or other cases where deleting copy pair and making copy pair constitute a series of processing. The processing speed is thus improved.

The computer system may have another data center which has a disk unit 670 where a logical volume 41 is set up to be paired with the existing logical volumes and form new pairs.

Specifically, the logical volume 21 of the disk unit 570 in the secondary data center 500 and the logical volume 41 of the disk unit 670 form a synchronous copy pair. The logical volume 41 of the disk unit 670 is also paired with the logical volume 01 of the disk unit 270 to form an asynchronous copy pair.

By changing copy pair settings in this way, fail over can be executed while maintaining the original cascade configuration.

Figure 18:
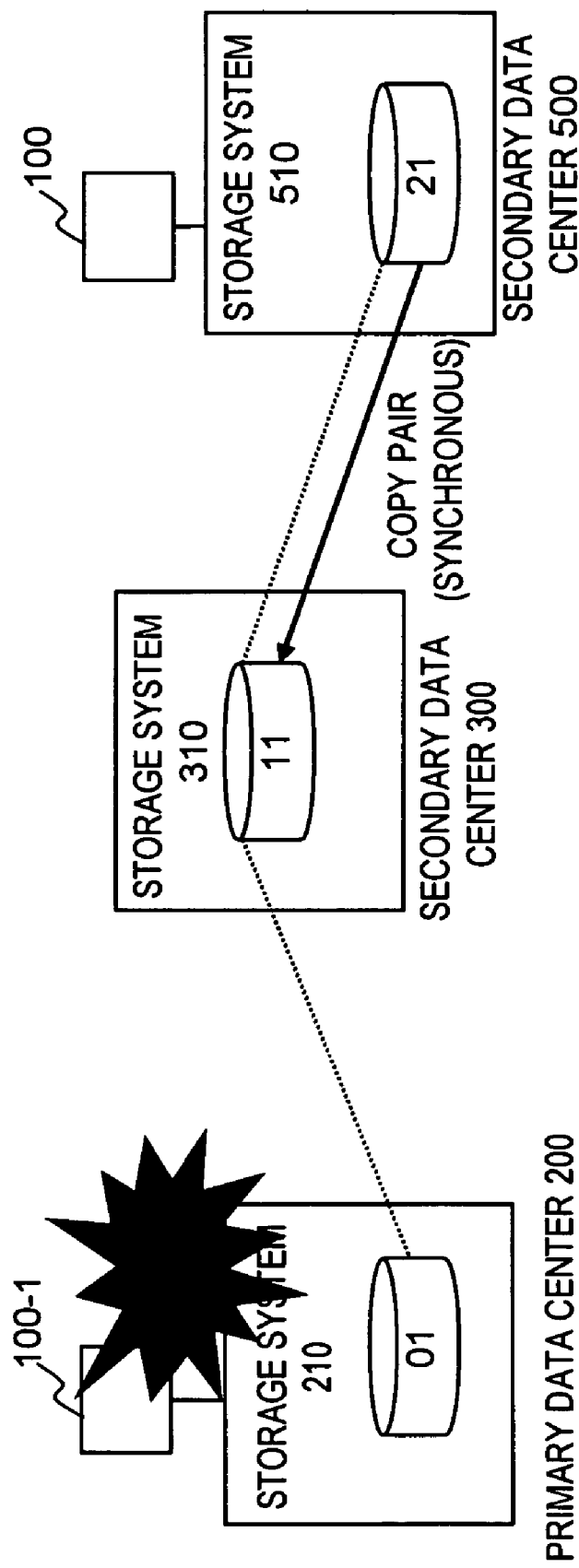
FIG. 18 is a block diagram of a computer system having a cascade configuration.

FIG. 18 shows another modified example in which a failure occurs in the cascade configuration that is constituted of the three data centers described above with reference to FIG. 15A.

In FIG. 18, a failure has occurred in the host computer 100-1 and throughout the primary data center 200.

When a failure occurs throughout the primary data center 200, the host computer 100-1 and the disk unit 270 of the primary data center 200 are inoperable. Then, in order to execute fail over of the computer system, the copy pair settings are changed as follows:

(1) The synchronous copy pair formed between the logical volume 01 of the disk unit 270 in the storage system 210 of the primary data center 200 and the logical volume 11 of the disk unit 370 in the storage system 310 of the secondary data center 300 is deleted.

(2) The asynchronous copy pair formed between the logical volume 11 of the disk unit 370 in the storage system 310 of the secondary data center 300 and the logical volume 21 of the disk unit 570 in the storage system 510 of the secondary data center 500 is deleted.

(3) A new asynchronous copy pair is formed between the logical volume 21 of the disk unit 570 in the storage system 510 of the secondary data center 500 and the logical volume 11 of the disk unit 370 in the storage system 310 of the secondary data center 300.

These instructions are issued by a host computer 100 that is connected to the secondary data center 300, or a host computer 100 that is connected to the secondary data center 500, or other host computer in place of the downed host computer 100-1.

First, for the processing of (1), the host computer 100 sends command data 400 to the disk controller unit 220 of the secondary data center 300. This command data 400 contains a command parameter 410 that instructs deleting the pair.

Next, for the processing of (2), the host computer 100 sends command data 400 to the disk controller unit 320 of the secondary data center 300. This command data 400 contains a command parameter 410 that instructs deleting the pair and an ACL instruction parameter 420 that gives instructions on how logical volumes in a simplex state are guarded and designates next copy pair information.

The ACL instruction parameter 420 in this case is as follows:

"Effective" is stored in the field of a P-VOL directed instruction 4201. This instructs to set guard to the primary logical volume, namely, the logical volume 11. As the guard feature, read protect during simplex 4202 is set to "off" and write protect during simplex 4203 is set to "on". This allows data read in the logical volume 01 when it is put into a simplex state while prohibiting data write.

The next copy type 4204 is set to "synchronous copy (S)", and the logical volume 21 of the disk unit 570 connected to the disk controller unit 520 is set as the next pair partner 4205. As a result, the logical volume 11 is paired, in the next copy, which is synchronous copy, with the logical volume 21 of the disk unit 570 connected to the disk controller unit 520, and serves as (S), the secondary volume, in the next synchronous copy.

"Effective" is stored in the field of an SP-VOL directed instruction 4201. This instructs to set guard to the secondary logical volume, namely, the logical volume 21. As the guard feature, read protect during simplex 4202 is set to "off" and write protect during simplex 4203 is set to "on". This allows data read in the logical volume 01 when it is put into a simplex state while prohibiting data write.

A next copy type 4204 is set to "synchronous copy (P)", and the logical volume 11 of the disk unit 370 connected to the disk controller unit 320 is set as a next pair partner 4205. As a result, the logical volume 21 is paired, in the next copy, which is synchronous copy, with the logical volume 11 of the disk unit 370 connected to the disk controller unit 320, and serves as (P), the primary volume, in the next synchronous copy.

The ACL 242 is set from this ACL instruction parameter 420, and thus guard settings for the logical volumes 11 and 21 are set.

Through the processing of (1) and (2), the unstable data can be guarded from the moment the failure has occurred until fail over is completed.

Next, for the processing of (3), the host computer 100 sends the command data 400 to the disk controller unit 320 of the secondary data center 300. This command data 400 contains the command parameter 410 that instructs making pair.

The host computer 100 can retrieve information necessary to create this command data 400 from the copy group association definition information 1222 described above.

The command parameter 410 in this case is as follows:

"Make synchronous pair" is stored as the command specifics 4101, the logical volume 21 of the disk unit 570 connected to the disk controller unit 520 is stored as the P-VOL 4102, and the logical volume 11 of the disk unit 370 connected to the disk controller unit 320 is stored as the S-VOL 4103.

As a result of the processing of (1), (2) and (3), the computer system obtains the configuration shown in FIG. 18. In other words, the logical volume 21 of the disk unit 570 in the secondary data center 500 and the logical volume 11 of the disk unit 370 in the secondary data center 300 form a synchronous copy pair. Thus, the data of the logical volume 11 in the secondary data center 300 that has been kept by synchronous copy is recovered with the use of the data of the logical volume 21 in the secondary data center 500 that has been kept by asynchronous copy.

In this way, fail over can be executed when a failure has occurred in the primary data center 200 and the host computer 100-1.

Figure 19A:
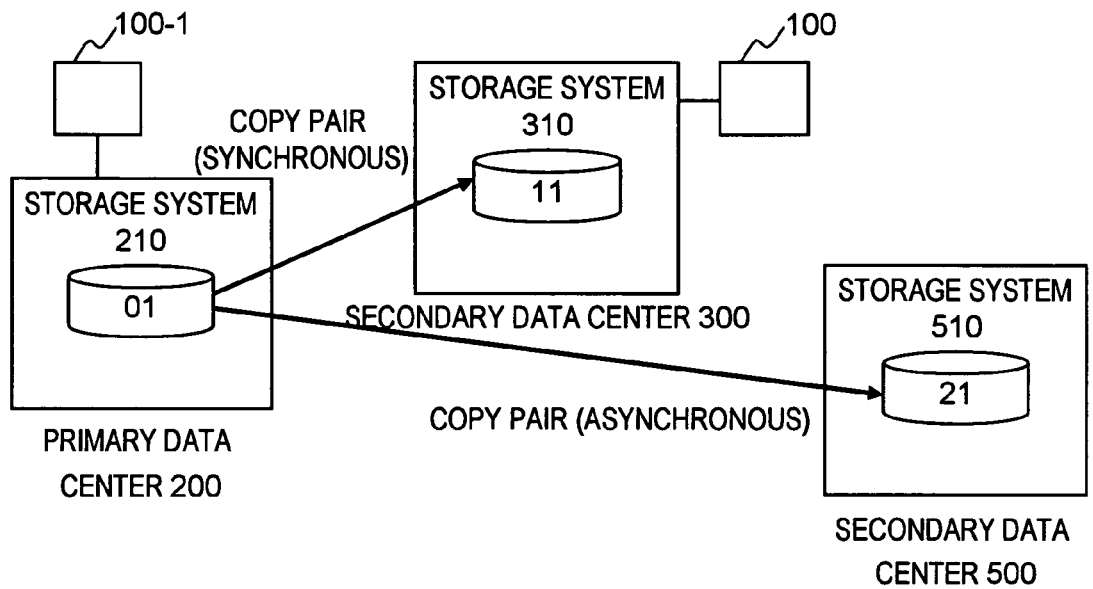
FIGS. 19A and 19B are block diagrams of a computer system having a multi-target configuration.
Figure 19B:
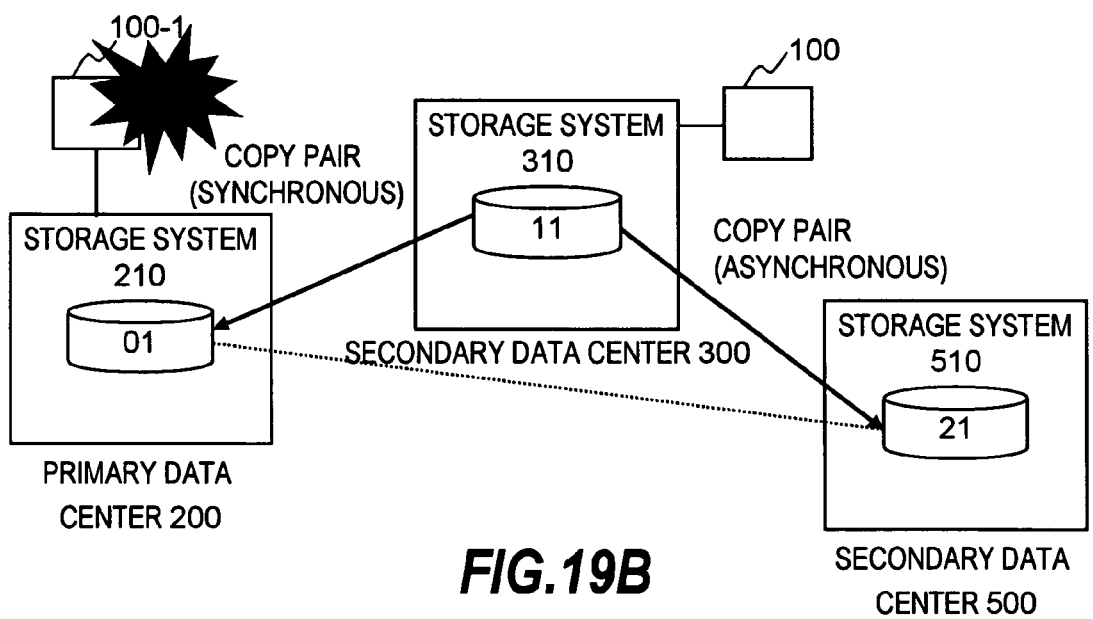

FIGS. 19A and 19B are block diagrams of still another modified example in which a computer system has a multi-target configuration constituted of three data centers.

A logical volume 01 of a disk unit 270 in a storage system 210 of a primary data center 200 and a logical volume 11 of a disk unit 370 in a storage system 310 of a secondary data center 300 form a synchronous copy pair. The logical volume 01 of the disk unit 270 in the storage system 210 of the primary data center 200 and a logical volume 21 of a disk unit 570 in a storage system 510 of a secondary data center 500 form an asynchronous copy pair. A configuration in which a volume in one data center forms copy pairs with volumes in different data centers as this is called a multi-target configuration.

Now, a case in which a failure has occurred only in a host computer 100-1, which is connected to the primary data center 200.

When a failure occurs in the host computer 100-1 alone, the disk unit 270 of the primary data center 200 connected to the host computer 101-1 is operable. Then, in order to execute fail over of the computer system, the copy pair settings are changed as follows:

(1) The synchronous copy pair formed between the logical volume 01 of the disk unit 270 in the storage system 210 of the primary data center 200 and the logical volume 11 of the disk unit 370 in the storage system 310 of the secondary data center 300 is suspended.

(2) The copy pair suspended in (1) is resynchronized in the reverse direction (a pair restoration instruction). The resynchronization creates a synchronous copy pair in which the logical volume 01 of the disk unit 270 in the primary data center 200 serves as the secondary volume and the logical volume 11 of the disk unit 370 in the secondary data center 300 serves as the primary volume.

(3) The asynchronous copy pair formed between the logical volume 01 of the disk unit 270 in the storage system 210 of the primary data center 200 and the logical volume 21 of the disk unit 570 in the storage system 510 of the secondary data center 500 is deleted.

(4) A new asynchronous copy pair is formed between the logical volume 11 of the disk unit 370 in the secondary data center 300 and the logical volume 21 of the disk unit 570 in the storage system 510 of the secondary data center 500.

These instructions are issued by a host computer 100 that is connected to the secondary data center 300, or a host computer 100 that is connected to the secondary data center 500, or other host computer in place of the downed host computer 100-1.

First, for the processing of (1), the host computer 100 sends command data 400 to the disk controller unit 320 of the secondary data center 300. This command data 400 contains a command parameter 410 that instructs suspending copy pair.

Next, for the processing of (2), the host computer 100 sends the command data 400 to the disk controller unit 320 of the secondary data center 300. This command data 400 contains the command parameter 410 that instructs to switch the primary logical volume and the secondary logical volume in the suspended copy pair and gives instructions on resynchronizing copy pair.

The host computer 100 can retrieve information necessary to create this command data 400 from the copy group association definition information 1222 described above.

Next, for the processing of (3), the host computer 100 sends the command data 400 to the disk controller unit 320 of the secondary data center 300. This command data 400 contains the command parameter 410 that instructs deleting the pair and an ACL instruction parameter 420 that gives instructions on how logical volumes in a simplex state are guarded and designates next copy pair information.

The ACL instruction parameter 420 in this case is as follows:

"Effective" is stored in the field of an S-VOL directed instruction 4206. This instructs to set guard to the secondary logical volume, namely, the logical volume 21. As the guard feature, read protect during simplex 4207 is set to "off" and write protect during simplex 4208 is set to "on". This allows data read in the logical volume 21 when it is put into a simplex state while prohibiting data write.

A next copy type 4209 is set to "asynchronous copy (S)", and the logical volume 11 of the disk unit 320 connected to the disk controller unit 320 is set as a next pair partner 4210. As a result, the logical volume 21 is paired, in the next copy, which is asynchronous copy, with the logical volume 11 of the disk unit 320 connected to the disk controller unit 320, and serves as (S), the secondary volume, in the next asynchronous copy.

An ACL 242 is set from this ACL instruction parameter 420, and thus guard settings for the logical volume 21 are set.

Through the processing of (3), the unstable volume pair state can be guarded from the moment the failure has occurred until fail over is completed.

Next, for the processing of (4), the host computer 100 sends the command data 400 to the disk controller unit 320 of the secondary data center 300. This command data 400 contains the command parameter 410 that instructs making pair.

The host computer. 100 can retrieve information necessary to create this command data 400 from the copy group association definition information 1222 described above.

As a result of the processing of (1), (2), (3), and (4), the computer system obtains the configuration shown in FIG. 19B. In other words, the logical volume 11 of the disk unit 370 in the secondary data center 300 and the logical volume 01 of the disk unit 270 in the primary data center 200 form a synchronous copy pair. The logical volume 11 of the disk unit 370 in the secondary data center 300 is also paired with the logical volume 21 of the disk unit 570 in the secondary data center 500 to form an asynchronous copy pair. Thus, the data of the logical volume 01 in the primary data center 200 and the data of the logical volume 21 in the secondary data center 500 are recovered with the use of the data of the logical volume 11 in the secondary data center 300 that has been kept by synchronous copy.

In this way, fail over is executed while maintaining the original multi-target configuration when a failure has occurred in the host computer 100-1 connected to the primary data center 200.

Figure 20:
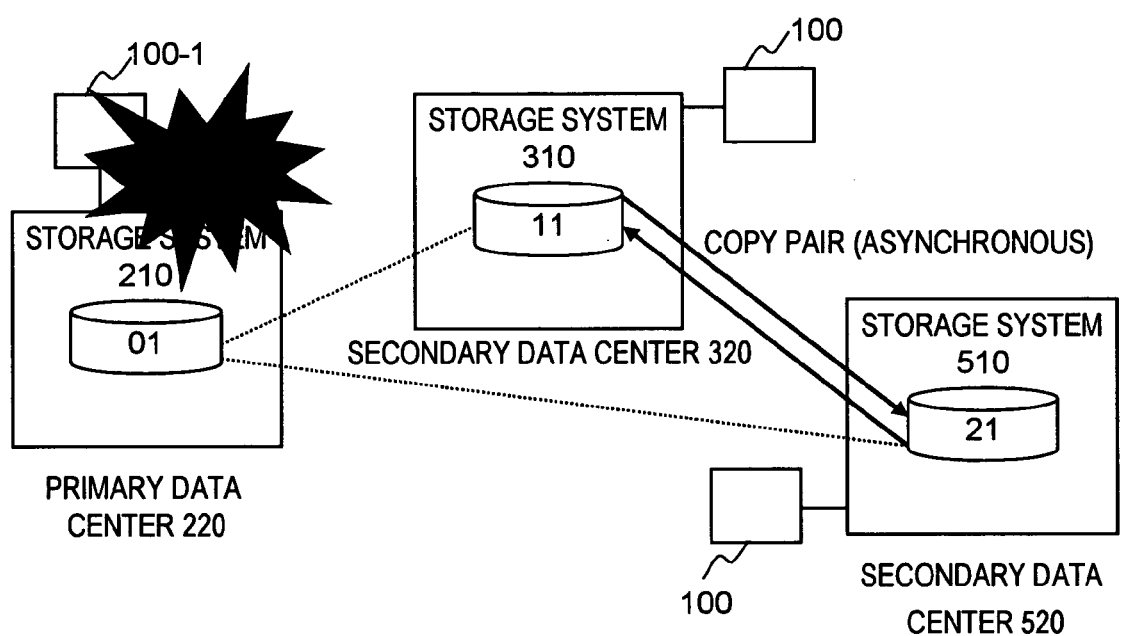
FIG. 20 is a block diagram of a computer system having a multi-target configuration according to another modified example.

FIG. 20 shows yet still another modified example in which a failure occurs in the multi-target configuration that is constituted of the three data centers described above with reference to FIG. 19A.

In FIG. 20, a failure has occurred in the host computer 100-1 and throughout the primary data center 200.

When a failure occurs throughout the primary data center 200, the host computer 100-1 and the disk unit 270 of the primary data center 200 are inoperable.

Then, in order to execute fail over of the computer system, the copy pair settings are changed as follows:

(1) The synchronous copy pair formed between the logical volume 01 of the disk unit 270 in the primary data center 200 and the logical volume 11 of the disk unit 370 in the secondary data center 300 is deleted.

(2) The asynchronous copy pair formed between the logical volume 01of the disk unit 270 in the primary data center 200 and the logical volume 21 of the disk unit 570 in the secondary data center 500 is deleted.

(3) Which of the data kept in the logical volume of the secondary data center 300 and the data kept in the logical volume of the secondary data center 500 is used to run the computer system is determined.

(4) A new asynchronous copy pair is formed between the logical volumes of the secondary data centers 300 and 500 with the logical volume chosen in (3) serving as the primary volume and the other serving as the secondary volume.

These instructions are issued by a host computer that is connected to the secondary data center 300, or a host computer that is connected to the secondary data center 500, or other host computer in place of the downed host computer 100-1.

First, for the processing of (1), the host computer 100 sends command data 400 to the disk controller unit 320 of the secondary data center 300. This command data 400 contains a command parameter 410 that instructs deleting the pair and an ACL instruction parameter 420 that gives instructions on how logical volumes in a simplex state are guarded and designates next copy pair information.

The ACL instruction parameter 420 in this case is as follows:

"Effective" is stored in the field of an S-VOL directed instruction 4206. This instructs to set guard to the secondary logical volume, namely, the logical volume 11. As the guard feature, read protect during simplex 4207 is set to "off" and write protect during simplex 4208 is set to "on". This allows data read in the logical volume 11 when it is put into a simplex state while prohibiting data write.

The next copy type 4209 is set to "asynchronous copy (S or P)", and no logical volume is set as the next pair partner 4210. As a result, the logical volume 11 serves as the primary volume or the secondary volume in the next copy which is asynchronous copy.

An ACL 242 is set from this ACL instruction parameter 420, and thus guard settings for the logical volume 11 are set.

Next, for the processing of (2), the host computer 100 sends the command data 400 to the disk controller unit 320 of the secondary data center 300. This command data 400 contains the command parameter 410 that instructs deleting the pair and the ACL instruction parameter 420 that gives instructions on how logical volumes in a simplex state are guarded and designates next copy pair information.

The ACL instruction parameter 420 in this case is as follows:

"Effective" is stored in the field of an S-VOL directed instruction 4206. This instructs to set guard to the secondary logical volume, namely, the logical volume 21. As the guard feature, read protect during simplex 4207 is set to "off" and write protect during simplex 4208 is set to "on". This allows data read in the logical volume 21 when it is put into a simplex state while prohibiting data write.

The next copy type 4209 is set to "asynchronous copy (S or P)", and no logical volume is set as the next pair partner 4210. As a result, the logical volume 21 serves as the primary volume or the secondary volume in the next copy which is synchronous copy.

An ACL 242 is set from this ACL instruction parameter 420, and thus guard settings for the logical volume 21 are set.

Through the processing of (1) and (2), the unstable volume pair state can be guarded from the moment the failure has occurred until fail over is completed.

Next, the processing of (3) is executed to determine which of the data kept in the logical volume of the secondary data center 300 and the data kept in the logical volume of the secondary data center 500 is used to run the computer system. The decision may be made by an administrator through analysis of the situation that has led to the failure. Alternatively, which of the two secondary data centers is to run the computer system may be determined in advance.

Next, for the processing of (4), the host computer 100 sends the command data 400 to the disk controller unit 320 of the secondary data center 300. This command data 400 contains the command parameter 410 that instructs making pair.

The host computer 100 can retrieve information necessary to create this command data 400 from the copy group association definition information 1222 described above.

The command parameter 410 in this case is as follows:

"Making asynchronous pair" is stored as the command specifics 4101, the logical volume of the disk controller unit that is determined in (3) as the primary volume is stored as the P-VOL 4102, and the logical volume of the disk controller unit that is determined in (3) as the secondary volume is stored as the S-VOL 4103.

As a result of the processing of (1), (2), (3), and (4), the computer system obtains the configuration shown in FIG. 20. In other words, the logical volume 11 of the disk unit 370 in the secondary data center 300 and the logical volume 21 of the disk unit 570 in the secondary data center 500 form an asynchronous copy pair in which the logical volume of the data center chosen in (3) serves as the primary volume. Thus, the data of the logical volume 11 in the secondary data center 300 is recovered with the use of the data of the logical volume 21 in the secondary data center 500 that has been kept by asynchronous copy. Alternatively, the data of the logical volume 21 in the secondary data center 500 is recovered with the use of the data of the logical volume 11 in the secondary data center 300 that has been kept by synchronous copy.

In this way, fail over can be executed when a failure has occurred in the primary data center 200 and the host computer 100-1.

Several modified examples have been described above. The effects of this invention include maintaining data consistency and thereby improving the reliability of a computer system. This effect is achieved by setting guarding settings for logical volumes that have formed a copy pair but now are in a simplex state because the copy pair is deleted, and thus protecting the logical volumes from a disturbance. Another effect of this invention is to improve the usability of the computer system as a disaster recovery system.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
   a storage system comprising a disk controller which controls data read/write in a disk drive; and
   a host computer which transmits a request to the storage system, wherein:
   wherein the disk controller has a control unit and a storage unit;
   the disk drive has logical volumes which are data storing areas;
   the host computer sends a request directed to the logical volume and attribute information of the logical volume;
   the control unit:
      executes the received request;
      stores, in the storage unit, the received attribute information in association with the logical volume; and
      decides to execute a following request which is made by the host computer to the logical volume in a case where the request meets the attribute information corresponding to the logical volume and is stored in the storage unit.

2. The computer system according to claim 1, wherein the attribute information includes one of write inhibition, read inhibition, and designation of a state to be set next to the logical volume.

3. The computer system according to claim 1, wherein, when execution of the received request has failed, the control unit deletes, out of the stored attribute information, attribute information associated with the logical volume that is related to the failed request.

4. A computer system, comprising:
   a primary storage system and a secondary storage system each comprising a disk controller which controls data read/write in a disk drive; and
   a host computer which transmits a request to the primary storage system, wherein:
   the disk controller has a control unit and a storage unit;
   the disk drive has logical volumes which are data storing areas, and a logical volume of the primary storage system and a logical volume of the secondary storage system forming a copy pair;

the host computer sends a request to delete the copy pair and attribute information of the logical volumes that constitute the copy pair;

the control unit:

deletes a copy pair in accordance with the received request;

stores, in the storage unit, the received attribute information in association with the logical volumes that have formed the deleted copy pair; and decides to execute a following request which is made by the host computer to the logical volumes in a case where the request meets the attribute information corresponding to the logical volumes and is stored in the storage unit.

5. The computer system according to claim 4, wherein the attribute information includes one of write inhibition, read inhibition, designation of a type of a copy pair requested next, and designation of a logical volume to be paired with in the copy pair requested next.

6. The computer system according to claim 4, wherein, when copy pair deletion executed in accordance with the received request has failed, the control unit deletes, stored attribute information of the logical volumes corresponding to the copy pair that has been deleted unsuccessfully.

7. The computer system according to claim 4, wherein, when it is judged that the received copy pair deletion request is not executed by the disk controller of the primary storage system, the control unit of the primary storage system sends the copy pair deletion request to the disk controller of the secondary storage system.

8. The computer system according to claim 4, wherein:

the host computer has a host control unit and a host storage unit, and when the host computer requests deletion of the copy pair, the host control unit:

obtains, from the host storage unit, information of the copy pair requested to be deleted;

identifies logical volumes that constitute the copy pair from the obtained copy pair information;

sets attribute information of the logical volumes for when the copy pair is deleted; and sends the copy pair deletion request and the set attribute information to the disk controller.

9. The computer system according to claim 4, wherein, the host computer has a host control unit and a host storage unit, and when the host computer requests deletion of the copy pair, the host control unit:

obtains, from the host storage unit, information of the copy pair requested to be deleted, and information of a copy pair that is associated with the copy pair requested to be deleted;

identifies logical volumes that constitute the copy pair from the obtained copy pair information and the associated copy pair information;

determines what processing is requested next from the associated copy pair information;

sets, in accordance with the processing to be requested next, attribute information of the logical volumes for when the copy pair is deleted; and sends the copy pair deletion request and the set attribute information to the disk controller.

10. A computer system, comprising:

a primary storage system and a secondary storage system each comprising a disk controller which controls data read/write in a disk drive; and a host computer which transmits a request to the primary storage system, wherein:

the disk drives have logical volumes which are data storing areas, and a logical volume of the primary storage system and a logical volume of the secondary storage system forming a copy pair, the host computer has a management module which creates a request to delete the copy pair and attribute information of the logical volumes that constitute the copy pair, and sends the request and the attribute information to the disk controller of the primary storage system, and the disk controller of the primary storage system includes:

a reception module which receives the request and the attribute information sent from the management module;

a copy processing module which executes, in accordance with the received request, deletion of the copy pair constituted of the logical volumes; and an attribute information checking module which stores, in a disk unit, the received attribute information in association with the logical volumes that have formed the deleted copy pair, and which decides to execute a following request which is made by the host computer to the logical volumes in a case where the request meets the attribute information corresponding to the logical volumes and is stored in the storage unit.

11. A host computer connected to a computer system to send a request to the computer system, the computer system having a primary storage system and a secondary storage system each of which comprises a disk controller which controls data read/write in a disk drive, the host computer comprising a host control module and a host storage unit, wherein:

the disk drives have logical volumes which are data storing areas, and a logical volume of the primary storage system and a logical volume of the secondary storage system forming a copy pair;

the host storage unit stores information of the copy pair constituted of the logical volumes; and when the host computer requests deletion of the copy pair, the host control module:

obtains, from the host storage unit, information of the copy pair requested to be deleted;

identifies logical volumes that constitute the copy pair from the obtained copy pair information;

sets attribute information of the logical volumes for when the copy pair is deleted; and sends the copy pair deletion request and the set attribute information to the disk controller of the primary storage system.

12. The host computer according to claim 11, wherein the attribute information includes one of write inhibition, read inhibition, designation of a type of a copy pair requested next, and designation of a logical volume to be paired with in the copy pair requested next.

13. The host computer according to claim 11, wherein, when the host computer requests deletion of the copy pair, the host control module:

obtains, from the host storage unit, information of the copy pair requested to be deleted, and information of a copy pair that is associated with the copy pair requested to be deleted;

identifies logical volumes that constitute the copy pair from the obtained copy pair information and the associated copy pair information;

determines what processing is requested next from the associated copy pair information;

sets, in accordance with the processing to be requested next, attribute information of the logical volumes for when the copy pair is deleted; and sends the copy pair deletion request and the set attribute information to the disk controller.

14. A copy pair processing method of controlling a computer system to execute copy pair processing, the computer system having a primary storage system and a secondary storage system each of which has a disk controller which controls data read/write in a disk drive, the disk drive having logical volumes which are data storing areas, a logical volume of the primary storage system being paired with a logical volume of the secondary storage system to form a copy pair, the method comprising the steps of:

sending a request to delete the copy pair and attribute information of the logical volumes that constitute the copy pair;

executing copy pair deletion in accordance with the received request;

storing, in a storage unit of the disk controller, the received attribute information in association with the logical volumes that have formed the deleted copy pair; and deciding to execute a following request which is made by the host computer to the logical volumes in a case where the request meets the attribute information corresponding to the logical volumes and is been stored in the storage unit.

15. The copy pair processing method according to claim 14, wherein the attribute information is one of write inhibition, read inhibition, designation of a type of a copy pair requested next, and designation of a logical volume to be paired with in the copy pair requested next.

16. The copy pair processing method according to claim 14, wherein the step of sending a request to delete the copy pair and attribute information of the logical volumes that constitute the copy pair includes the steps of:

obtaining, from the host storage unit, information of the copy pair requested to be deleted;

identifying logical volumes that constitute the copy pair from the obtained copy pair information;

setting attribute information of the logical volumes for when the copy pair is deleted; and sending the copy pair deletion request and the set attribute information to the disk controller.

17. The copy pair processing method according to claim 14, further comprising the step of deleting, when copy pair deletion executed in accordance with the received request has failed, out of the stored attribute information, attribute information of the logical volumes corresponding to the copy pair that has been deleted unsuccessfully.

* * * * *

UNITED STATES PATENT AND TRADEMARK OFFICE
CERTIFICATE OF CORRECTION

PATENT NO. : 7,281,098 B2
APPLICATION NO. : 11/146114
DATED : October 9, 2007
INVENTOR(S) : Y. Hiraiwa et al.

It is certified that error appears in the above-identified patent and that said Letters Patent is hereby corrected as shown below:

Col. 30, Line 1
Please amend claims 10 and 11 as follows:

--      10. A computer system, comprising:

a primary storage system and a secondary storage system each comprising a disk controller which controls data read/write in ~~a~~ disk ~~drive~~drives; and a host computer which transmits a request to the primary storage system, wherein:

the disk drives have logical volumes which are data storing areas, and a logical volume of the primary storage system and a logical volume of the secondary storage system forming a copy pair, the host computer has a management module which creates a request to delete the copy pair and attribute information of the logical volumes that constitute the copy pair, and sends the request and the attribute information to the disk controller of the primary storage system, and the disk controller of the primary storage system includes:

a reception module which receives the request and the attribute information sent from the management module;

a copy processing module which executes, in accordance with the received request, deletion of the copy pair constituted of the logical volumes; and an attribute information checking module which stores, in a disk unit, the received attribute information in association with the logical volumes that have

UNITED STATES PATENT AND TRADEMARK OFFICE
CERTIFICATE OF CORRECTION

| | |
|---|---|
| PATENT NO. | : 7,281,098 B2 |
| APPLICATION NO. | : 11/146114 |
| DATED | : October 9, 2007 |
| INVENTOR(S) | : Y. Hiraiwa et al. |

It is certified that error appears in the above-identified patent and that said Letters Patent is hereby corrected as shown below:

formed the deleted copy pair, and which decides to execute a following request which is made by the host computer to the logical volumes in a case where the request meets the attribute information corresponding to the logical volumes and is stored in the storage unit.

Col. 30, Line 34

11. A host computer connected to a computer system to send a request to the computer system, the computer system having a primary storage system and a secondary storage system each of which comprises a disk controller which controls data read/write in ~~a~~ disk ~~drive~~drives, the host computer comprising a host control module and a host storage unit, wherein:

the disk drives have logical volumes which are data storing areas, and a logical volume of the primary storage system and a logical volume of the secondary storage system forming a copy pair;

the host storage unit stores information of the copy pair constituted of the logical volumes; and when the host computer requests deletion of the copy pair, the host control module:

obtains, from the host storage unit, information of the copy pair requested to be deleted;

identifies logical volumes that constitute the copy pair from the obtained copy

UNITED STATES PATENT AND TRADEMARK OFFICE
CERTIFICATE OF CORRECTION

PATENT NO. : 7,281,098 B2  
APPLICATION NO. : 11/146114  
DATED : October 9, 2007  
INVENTOR(S) : Y. Hiraiwa et al.

Page 3 of 3

It is certified that error appears in the above-identified patent and that said Letters Patent is hereby corrected as shown below:

pair information;

sets attribute information of the logical volumes for when the copy pair is deleted; and sends the copy pair deletion request and the set attribute information to the disk controller of the primary storage system. --

Signed and Sealed this

Twenty-second Day of January, 2008

JON W. DUDAS  
*Director of the United States Patent and Trademark Office*